US010025313B2

(12) United States Patent
Tojima et al.

(10) Patent No.: US 10,025,313 B2
(45) Date of Patent: Jul. 17, 2018

(54) MANAGEMENT SYSTEM AND MANAGEMENT METHOD OF MINING MACHINE

(71) Applicant: Komatsu Ltd., Tokyo (JP)

(72) Inventors: Masanori Tojima, Fujisawa (JP); Mitsuhiro Ryuman, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/360,475

(22) PCT Filed: Jul. 30, 2013

(86) PCT No.: PCT/JP2013/070666
§ 371 (c)(1),
(2) Date: May 23, 2014

(87) PCT Pub. No.: WO2015/015576
PCT Pub. Date: Feb. 5, 2015

(65) Prior Publication Data
US 2015/0253776 A1   Sep. 10, 2015

(51) Int. Cl.
*G05D 1/02* (2006.01)
(52) U.S. Cl.
CPC ......... *G05D 1/0214* (2013.01); *G05D 1/0261* (2013.01); *G05D 1/0278* (2013.01); *G05D 1/027* (2013.01); *G05D 2201/021* (2013.01)
(58) Field of Classification Search
CPC .............................. G05D 1/021; G05D 1/0214
See application file for complete search history.

(56) References Cited

U.S. PATENT DOCUMENTS

| 5,987,371 A | 11/1999 | Bailey et al. |
| 6,064,926 A | 5/2000 | Sarangapani et al. |
| 6,539,294 B1 | 3/2003 | Kageyama |
| 2002/0099481 A1 | 7/2002 | Mori |
| 2005/0075784 A1* | 4/2005 | Gray et al. .................... 701/201 |
| 2005/0213109 A1 | 9/2005 | Schell et al. |
| 2008/0162034 A1* | 7/2008 | Breen .................... G01C 21/26 701/533 |

(Continued)

FOREIGN PATENT DOCUMENTS

| CN | 102893176 A | 1/2013 |
| DE | 10225546 A1 | 1/2004 |

(Continued)

OTHER PUBLICATIONS

Office Action dated Dec. 22, 2014, issued for the Australian patent application No. 2013350342.

(Continued)

Primary Examiner — Michael D Lang
(74) Attorney, Agent, or Firm — Locke Lord LLP

(57) ABSTRACT

A management system of a mining machine includes: a landmark that is placed at a mine and allows a non-contact sensor placed on the mining machine able to run at the mine to detect a relative position of the landmark and the mining machine; a storage device that registers a position of the landmark detected using the Global Positioning System; and a processing device that sets, upon the registration, a prohibited area where an entry of the mining machine is prohibited such that the position of the landmark is included in the prohibited area.

12 Claims, 17 Drawing Sheets

(56) References Cited

U.S. PATENT DOCUMENTS

| | | | |
|---|---|---|---|
| 2010/0063680 A1* | 3/2010 | Tolstedt | G05D 1/0214 701/41 |
| 2012/0283905 A1 | 11/2012 | Nakano et al. | |
| 2013/0060458 A1* | 3/2013 | Makela | E21C 35/08 701/301 |
| 2014/0236477 A1* | 8/2014 | Chen | G05D 1/0257 701/450 |

FOREIGN PATENT DOCUMENTS

| | | |
|---|---|---|
| EP | 2562312 A2 | 2/2013 |
| JP | 05-127746 A | 5/1993 |
| JP | 09-212238 A | 8/1997 |
| JP | 11-242520 A | 9/1999 |
| JP | 11-296229 A | 10/1999 |
| JP | 2002-215236 A | 7/2002 |
| JP | 2004-125872 A | 4/2004 |
| JP | 2005-062083 A | 3/2005 |
| JP | 2006-209567 A | 8/2006 |
| JP | 5194543 B2 | 11/2008 |
| JP | 2011-128899 A | 6/2011 |
| WO | WO-2013/065412 A1 | 5/2013 |

OTHER PUBLICATIONS

Takehisa Yairi et al., "Map Construction Based on Cooccurrence Frequency of Landmark Observation," NRSJ, vol. 21, No. 2, Feb. 2003, pp. 212-223.

International Search Report and Written Opinion dated Aug. 27, 2013, issued for PCT/JP2013/070666.

Office Action dated Jun. 4, 2015, issued for the corresponding Canadian patent application No. 2877997.

* cited by examiner

MANAGEMENT SYSTEM AND MANAGEMENT METHOD OF MINING MACHINE

FIELD

The present invention relates to a management system and a management method of a mining machine.

BACKGROUND

Mining machines such as a dump truck, for example the one disclosed in Patent Literature 1, operate at a working of a mine.

CITATION LIST

Patent Literature

Patent Literature 1: Japanese Laid-open Patent Publication No. 11-242520

SUMMARY

Technical Problem

If a structure such as a landmark is installed at a mine and a mining machine comes into contact with the structure, productivity at the mine may be reduced. For example, the operation of the mining machine may be stopped due to the contact between the structure and the mining machine. As a consequence, productivity at the mine may be reduced.

An object of the present invention is to provide a management system and a management method of a mining machine, which can suppress a reduction in productivity at a mine.

Solution to Problem

According to the present invention, a management system of a mining machine comprises: a landmark that is placed at a mine and allows a non-contact sensor placed on the mining machine able to run at the mine to detect a relative position of the landmark and the mining machine; a storage device that registers a position of the landmark detected using the Global Positioning System; and a processing device that sets, upon the registration, a prohibited area where an entry of the mining machine is prohibited such that the position of the landmark is included in the prohibited area.

The present invention can further comprise an operating unit able to input an operation signal for registering the position of the landmark after the position of the landmark is detected using the Global Positioning System, wherein the registration can include an operation of the operating unit.

The present invention can further comprise a communication system that transmits an instruction signal to the mining machine to prevent the mining machine from entering the prohibited area.

The present invention can further comprise a generation apparatus that generates a travel route on which the mining machine runs, wherein the mining machine runs along the travel route on at least a part of a load site, a dump site, and a haul road leading to at least one of the load site and the dump site at the mine, and the generation apparatus generates the travel route to prevent the mining machine from entering the prohibited area.

According to the present invention, a management system of a mining machine, including a central control apparatus placed in a control facility, the management system comprises: a landmark that is placed at a mine and allows a non-contact sensor placed on the mining machine able to run at the mine to detect a relative position of the landmark and the mining machine; a storage device that is provided in the central control apparatus and registers a position of the landmark detected using the Global Positioning System; a processing device that is provided in the central control apparatus and sets, upon the registration, a prohibited area where an entry of the mining machine is prohibited such that the position of the landmark is included in the prohibited area; a generation apparatus that is provided in the central control apparatus and generates a travel route on which the mining machine runs to avoid the prohibited area; and a communication system that transmits to the mining machine information on the travel route generated by the generation apparatus, wherein the mining machine runs at the mine in accordance with the information on the travel route transmitted from the central control apparatus by the communication system.

In the present invention, the generation apparatus can generate the travel route in a manner where the landmark is situated in a detection area of the non-contact sensor.

In the present invention, whether the position of the landmark detected using the Global Positioning System is registered in the storage device can be determined based on a detection state of the Global Positioning System.

In the present invention, whether the position of the landmark detected using the Global Positioning System is registered in the storage device can be determined based on a relationship between the position of the landmark registered in the storage device and the position of the landmark detected using the Global Positioning System.

According to the present invention, a management method of a mining machine comprises: detecting a position of a landmark placed at a mine using the Global Positioning System; registering the detected position of the landmark in a storage device; upon the registration, setting a prohibited area where an entry of the mining machine able to run at the mine is prohibited such that the position of the landmark is included in the prohibited area; and allowing a non-contact sensor placed on the mining machine to detect the landmark and detecting a relative position of the mining machine running outside the prohibited area and the landmark.

According to the present invention, a management method of a mining machine, using a central control apparatus placed in a control facility, the management method comprises: detecting a position of a landmark placed at a mine using the Global Positioning System; registering the detected position of the landmark in a storage device provided in the central control apparatus; allowing a processing device provided in the central control apparatus to set, upon the registration, a prohibited area where an entry of the mining machine able to run at the mine is prohibited such that the position of the landmark is included in the prohibited area; allowing a generation apparatus provided in the central control apparatus to generate a travel route on which the mining machine runs to avoid the prohibited area; transmitting to the mining machine information on the travel route generated by the generation apparatus; and allowing a non-contact sensor placed on the mining machine to detect the landmark and detecting a relative position of the mining machine running in accordance with the information on the travel route transmitted from the central control apparatus and the landmark.

According to the present invention, a reduction in productivity at a mine is suppressed.

DESCRIPTION OF EMBODIMENTS

Hereinafter, an embodiment according to the present invention will be described with reference to the drawings. However, the present invention is not limited to the embodiment.

<Outline of Management System of Mining Machine>

Figure 1:
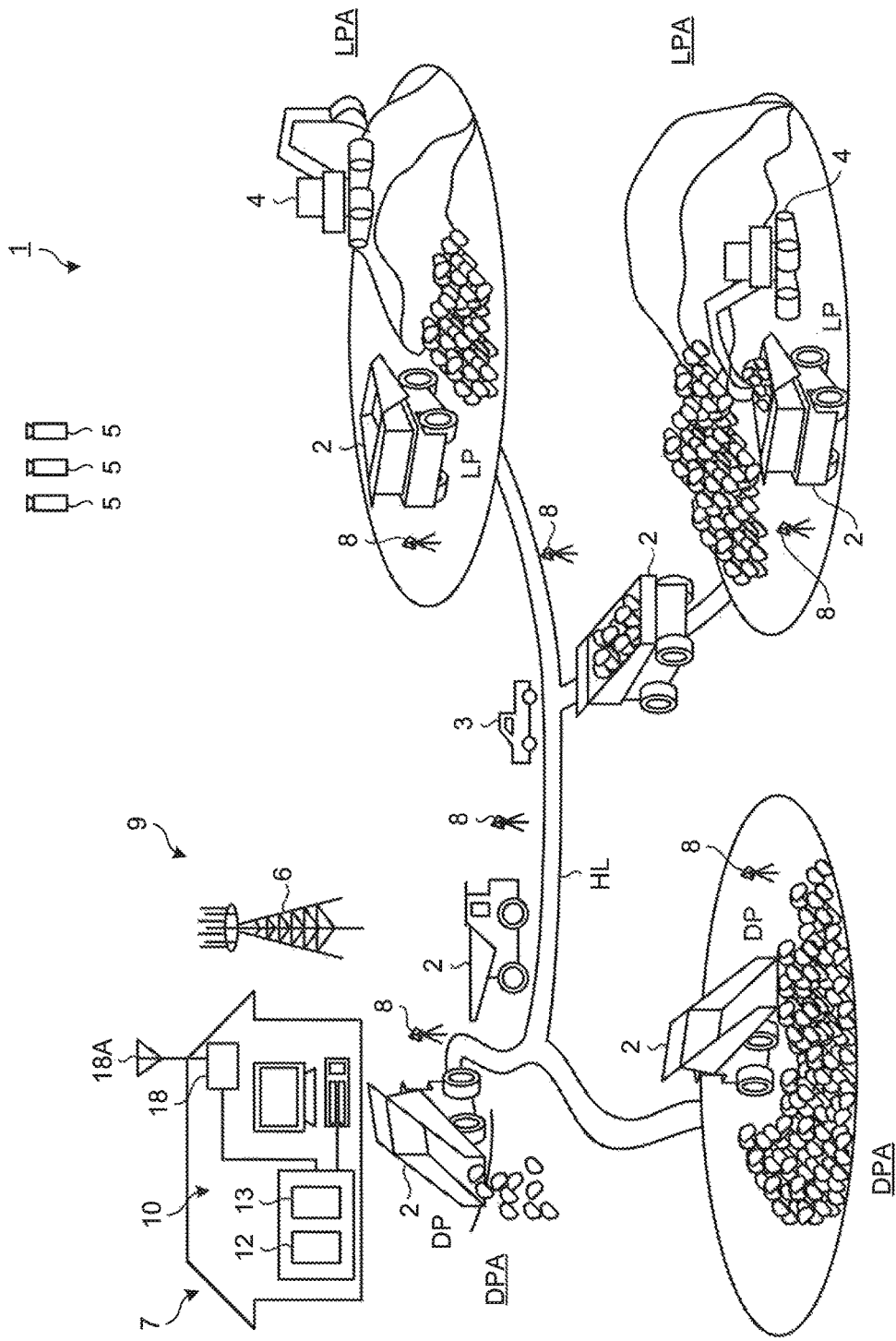
FIG. 1 is a diagram illustrating an example of a management system of a mining machine according to the embodiment.

FIG. 1 is a diagram illustrating an example of a management system 1 of a mining machine according to the embodiment. FIG. 1 schematically illustrates the management system 1 and sites where the management system 1 is applied.

The management system 1 includes a control apparatus 10 placed in a control facility 7, and manages mining machines. The management of mining machines includes at least one of operations control of mining machines, the evaluation of productivity of the mining machines, the evaluation of operation skill of the mining machine operators, the maintenance of the mining machines, and the abnormality diagnosis of the mining machines.

The mining machine is a generic name of machinery used for various operations at a mine. Mining machines include at least one of a boring machine, an excavating machine, a loading machine, and a transport machine. The excavating machines can excavate a mine. The loading machines can load the transport machine. The loading machines include at least one of an excavator, an electric shovel, and a wheel loader. The transport machine includes a moving body that can move at a mine, and can transport a load. The transport machines include a dump truck. The load includes at least either earth and sand or ores produced by excavation.

In the embodiment, the management system 1 manages the transport machines that can run at a mine. In the embodiment, a description will be given of an example where the management system 1 manages a dump truck 2. The dump truck 2 operates on at least parts of a load site LPA, a dump site DPA, and a haul road HL that leads to at least one of the load site LPA and the dump site DPA at the mine. The dump truck 2 is a moving body that can move at the mine. The dump truck 2 can run on at least parts of the load site LPA, the dump site DPA, and the haul road HL. The dump truck 2 can move between the load site LPA and the dump site DPA, running along the haul road HL.

The dump truck 2 is loaded with a load at the load site LPA. The load site LPA is an area (place) where at the mine the loading operation of a load is performed. The dump truck 2 is loaded with the load at a loading position LP at the load site LPA. The loading position LP is a position (loading point) where at the load site LPA a load loading operation is performed. The loading operation is an operation to load the dump truck 2 with a load. A loading machine 4 loads the dump truck 2 at the load site LPA. The loading machine 4 loads the dump truck 2 situated at the loading position LP.

The dump truck 2 unloads (deposits) the load at the dump site DPA. The dump site DPA is an area (place) where at the mine a load deposit operation is performed. The dump truck 2 deposits the load at a dumping position DP at the dump site DPA. The deposit operation is an operation to unload (deposit) a load from the dump truck 2. The load is deposited from the dump truck 2 at the dump site DPA. The dump truck 2 is situated at the dumping position DP and deposits the load.

In the embodiment, the dump truck 2 is what is called a driverless dump truck that operates by an instruction signal from the control apparatus 10. A worker (driver) does not ride in the dump truck 2.

In FIG. 1, the management system 1 includes a vehicle 3 that can run at a mine, the control apparatus 10 that is placed in the control facility 7 and controls the dump truck 2, landmarks 8 installed at the mine, a communication system 9 that can convey information.

The vehicle 3 is a moving body that can move at the mine. The vehicle 3 can run on at least parts of the load site LPA, the dump site DPA, and the haul road HL. A worker (driver) rides in the vehicle 3. In other words, the vehicle 3 is what is called a manned vehicle. The vehicle 3 runs at the mine to carry out various operations related to the mine including the management and maintenance of the mining machines. The worker rides in the vehicle 3 and moves to any given position (place) at the mine.

The control apparatus 10 is installed in the control facility 7 at the mine. The control facility 7 may be referred to as the control facility 7 or the central control room 7. The control apparatus 10 may be referred to as the control apparatus (central control apparatus) 10 or the central control system 10. The control apparatus 10 does not move but may be movable.

A plurality of the landmarks 8 is installed at the mine. The landmarks 8 are respectively placed at the load site LPA, the dump site DPA, and the haul road HL. The landmark 8 is a stationary object. The landmark 8 does not move from its installed position (place). The management system 1 uses the landmark 8 to correct the position of the dump truck 2. In the embodiment, the dump truck 2 runs along a generated travel route. When the dump truck 2 runs off the travel route, the management system 1 corrects the position of the dump truck 2 using the landmark 8 so as to cause the dump truck 2 to run along the travel route.

The communication system 9 conveys information between the vehicle 3, the control apparatus 10, and the dump truck 2. The control apparatus 10 and the dump truck 2 can communicate with each other via the communication system 9. The control apparatus 10 and the vehicle 3 can communicate with each other via the communication system 9. The dump truck 2 and the vehicle 3 can communicate with each other via the communication system 9. In the embodiment, the communication system 9 includes a wireless communication system. The vehicle 3, the control apparatus 10, and the dump truck 2 can wirelessly communicate with each other via the communication system 9. In the embodiment, the communication system 9 includes a relay 6 that relays a signal (radio wave) between the vehicle 3, the control apparatus 10, and the dump truck 2.

In the embodiment, the position of the dump truck 2, the position of the vehicle 3, and the position of the landmark 8 are detected using the global positioning system (Global Positioning System: GPS). GPS includes GPS satellites 5. GPS detects a position in the coordinate system (GPS coordinate system) that defines latitude, longitude, and altitude. The position detected by GPS includes coordinate data of latitude, longitude, and altitude. The positions of the dump truck 2, the vehicle 3, and the landmark 8 at the mine are detected by GPS. The position detected by GPS is an absolute position defined in the GPS coordinate system. In the following description, the position detected by GPS is referred to as the GPS position as appropriate. The GPS position is an absolute position. The GPS position is coordinate data (coordinate values) of latitude, longitude, and altitude.

<Control Apparatus>

Figure 2:
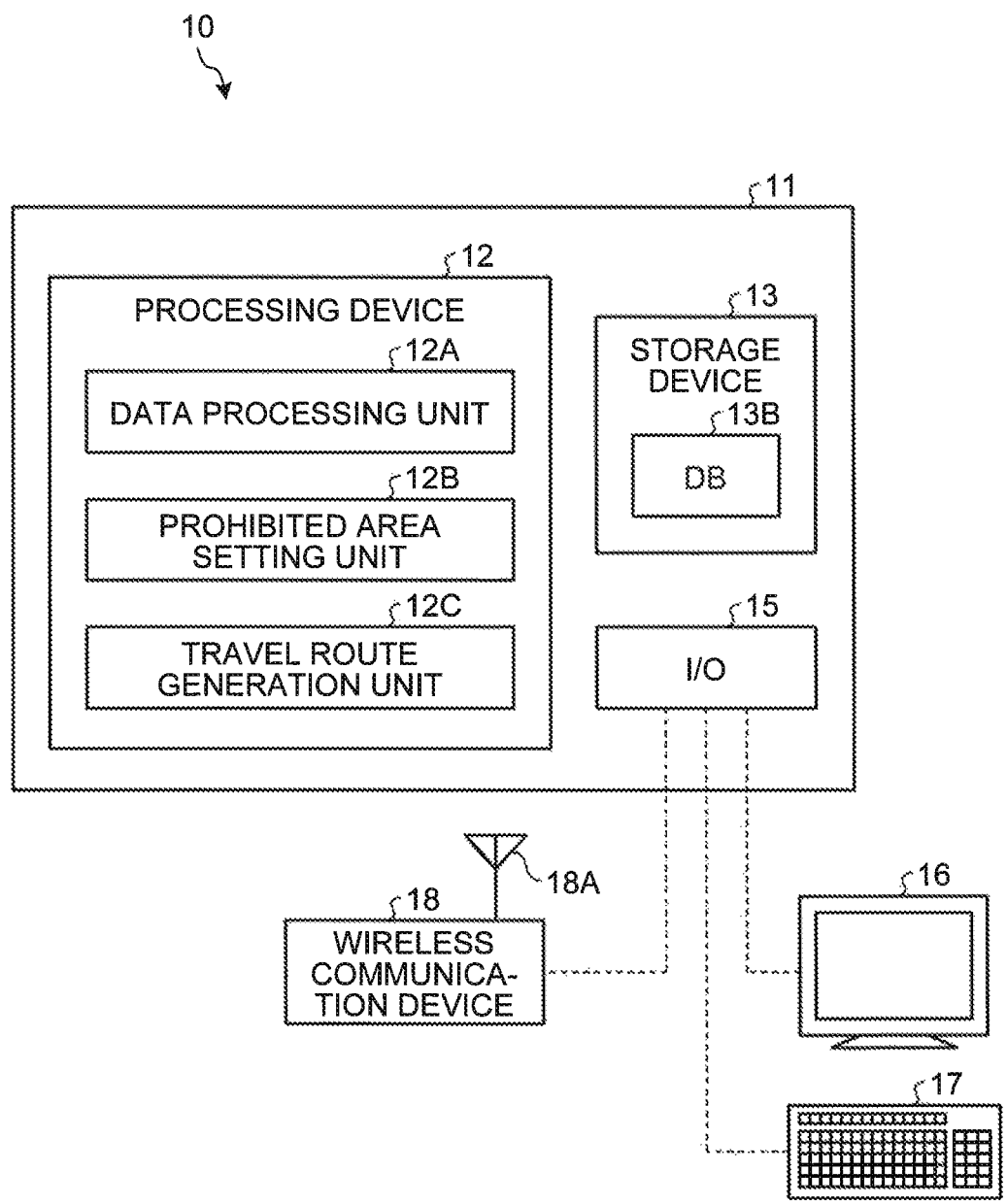
FIG. 2 is a diagram illustrating an example of a control apparatus according to the embodiment.

Next, the control apparatus 10 placed in the control facility 7 will be described. FIG. 2 is a block diagram illustrating an example of the control apparatus 10 according to the embodiment. As illustrated in FIGS. 1 and 2, the control apparatus 10 includes a computer system 11, a display device 16, an input device 17, and a wireless communication device 18.

The computer system 11 includes a processing device 12, a storage device 13, and an input/output unit 15. The display device 16, the input device 17, and the wireless communication device 18 are connected to the computer system 11 via the input/output unit 15. The input/output unit 15 is used for the input/output (interface) of information between the processing device 12 and at least one of the display device 16, the input device 17, and the wireless communication device 18.

The processing device 12 includes a CPU (Central Processing Unit). The processing device 12 executes various processes related to the management of the dump truck 2. The processing device 12 includes a data processing unit 12A, a prohibited area setting unit 12B, and a travel route generation unit 12C. In the embodiment, the data processing unit 12A processes information on the position of the dump truck 2, information on the position of the vehicle 3, and information on the position of the landmark 8, the information having been acquired via the communication system 9. The prohibited area setting unit 12B sets a prohibited area where at the mine the entry of the dump truck 2 is prohibited.

The travel route generation unit 12C generates a travel route where the dump truck 2 runs. The dump truck 2 runs along the travel route generated by the travel route generation unit 12C on at least parts of the load site LAP, the dump site DPA, and the haul road HL.

The storage device 13 is connected to the processing device 12. The storage device 13 includes at least one of a RAM (Random Access Memory), a ROM (Read Only Memory), a flash memory, and a hard disk drive. The storage device 13 stores various pieces of information on the management of the dump truck 2. The storage device 13 includes a database 13B where information is registered. The storage device 13 stores a computer program for causing the processing device 12 to execute various processes. The processing device 12 uses the computer program stored in the storage device 13 to process information on the position, set a prohibited area, and generate a travel route.

The display device 16 includes a flat panel display such as a liquid crystal display. The display device 16 can display information on the position of the dump truck 2, information on the position of the vehicle 3, and information on the position of the landmark 8.

The input device 17 includes at least one of a keyboard, a touch panel, and a mouse. The input device 17 functions as an operating unit that can input an operation signal into the processing device 12. A controller of the control facility 7 can input an operation signal into the processing device 12 by operating the input device 17.

The communication system 9 includes the wireless communication device 18. The wireless communication device 18 is placed in the control facility 7. The wireless communication device 18 is connected to the processing device 12 via the input/output unit 15. The wireless communication device 18 includes an antenna 18A. The wireless communication device 18 can receive information transmitted from at least one of the dump truck 2 and the vehicle 3. The information received by the wireless communication device 18 is output to the processing device 12. The information received by the wireless communication device 18 is stored (registered) in the storage device 13. The wireless communication device 18 can transmit information to at least one of the dump truck 2 and the vehicle 3.

<Dump Truck>

Figure 3:
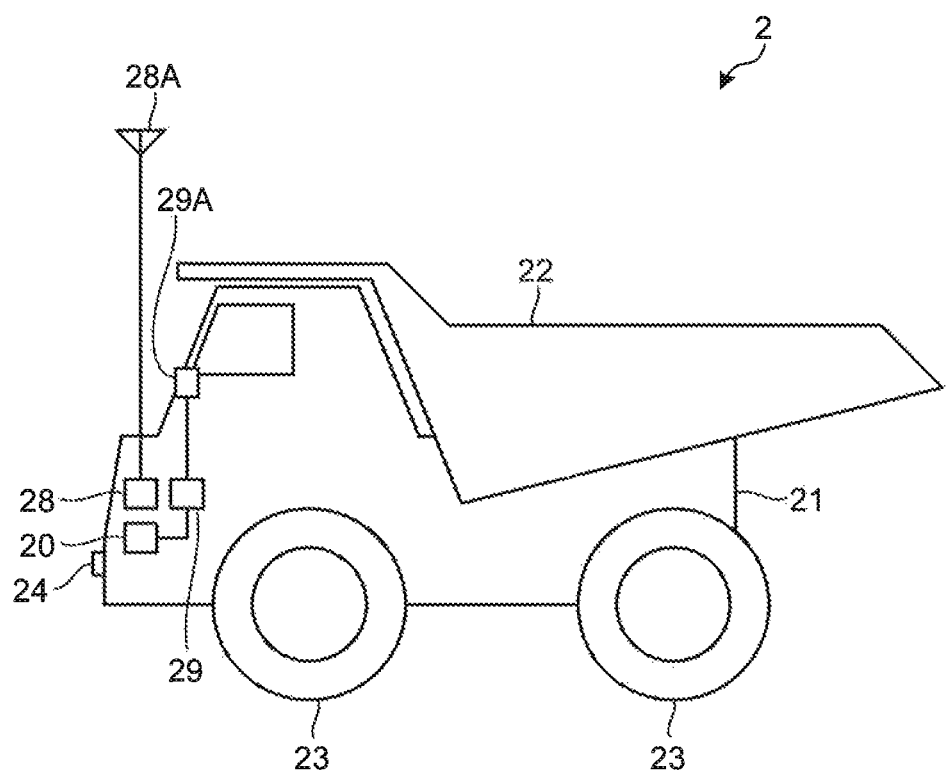
FIG. 3 is a diagram illustrating an example of a dump truck according to the embodiment.
Figure 4:
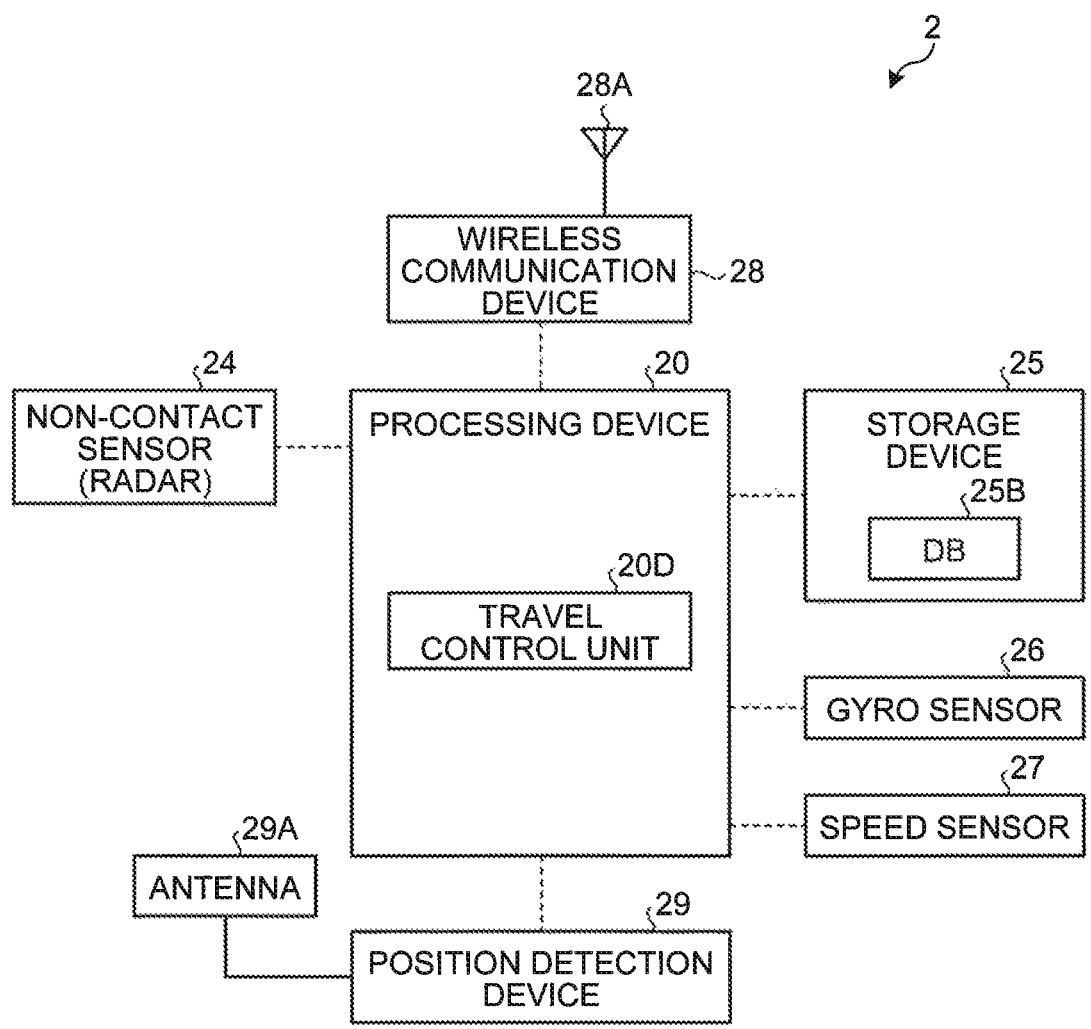
FIG. 4 is a diagram illustrating an example of a control system of the dump truck according to the embodiment.

Next, the dump truck 2 will be described. FIG. 3 is a diagram schematically illustrating the appearance of the dump truck 2 according to the embodiment. FIG. 4 is a control block diagram of the dump truck 2 according to the embodiment.

As illustrated in FIGS. 3 and 4, the dump truck 2 includes a vehicle body 21, a vessel 22, wheels 23, a non-contact sensor 24 that detects the landmark 8 in a non-contact manner, a processing device 20, a storage device 25, a gyro sensor 26, a speed sensor 27, a wireless communication device 28 to which an antenna 28A is connected, and a position detection device 29 to which an antenna 29A is connected.

A drive device is placed in the vehicle body 21. The drive device includes an internal combustion engine such as a diesel engine, a generator operated by the internal combustion engine, and a motor operated by electric power generated by the generator. The motor drives the wheels 23. The wheel 23 includes a tire and a wheel. The wheels 23 rotate with the power transmitted from the drive device of the vehicle body 21. The power of the internal combustion engine may be transmitted to the wheels 23 via a transmission including a torque converter.

The vessel 22 includes a bed where a load is loaded. The vessel 22 is swingably placed on the vehicle body 21. The loading machine 4 loads the vessel 22. The vessel 22 is lifted in the deposit operation to deposit the load.

The non-contact sensor 24 is placed at the front of the vehicle body 21. The non-contact sensor 24 detects the landmark 8 installed at the mine in a non-contact manner. In the embodiment, the non-contact sensor 24 includes a radar. The non-contact sensor 24 emits a radio wave to irradiate the landmark 8 with the radio wave. At least part of the radio wave by which the landmark 8 was irradiated is reflected from the landmark 8. The non-contact sensor 24 receives the radio wave reflected from the landmark 8. Consequently, the non-contact sensor 24 can detect a direction and a distance of the landmark 8 with respect to the non-contact sensor 24. The non-contact sensor 24 detects the relative positions of the non-contact sensor 24 and the landmark 8. The non-contact sensor 24 is fixed to the vehicle body 21. The non-contact sensor 24 is connected to the processing device 20. The non-contact sensor 24 outputs a detection signal to the processing device 20. The processing device 20 can obtain the relative positions of the dump truck 2 and the landmark 8 based on the detection signal of the non-contact sensor 24. In other words, the non-contact sensor 24 detects the relative position of the landmark 8 with respect to itself and accordingly the relative positions of the dump truck 2 and the landmark 8 are detected. Moreover, the non-contact sensor 24 functions as an obstacle detection sensor that detects an obstacle in front of the vehicle body 21.

The gyro sensor 26 detects the direction (amount of directional change) of the dump truck 2. The gyro sensor 26 is connected to the processing device 20. The gyro sensor 26 outputs a detection signal to the processing device 20. The processing device 20 can obtain the direction (amount of directional change) of the dump truck 2 based on the detection signal of the gyro sensor 26.

The speed sensor 27 detects the travel speed of the dump truck 2. In the embodiment, the speed sensor 27 detects the rotational speed of the wheel 23 to detect the speed (travel speed) of the dump truck 2. The speed sensor 27 is connected to the processing device 20. The speed sensor 27 outputs a detection signal to the processing device 20. The processing device 20 can obtain a travel distance of the dump truck 2 based on the detection signal of the speed sensor 27 and time information from a timer built in the processing device 20.

The processing device 20 is mounted in the dump truck 2. The processing device 20 includes a CPU (Central Processing Unit). The processing device 20 executes various processes related to the management of the dump truck 2. The processing device 20 includes a data processing unit, a prohibited area setting unit, and a travel route generation unit, and can execute processes equivalent to those of the processing device 12 placed in the control facility 7. In other words, the data processing unit of the processing device 20 can process information on the position of the dump truck 2, information on the position of the vehicle 3, and information on the position of the landmark 8. The prohibited area setting unit of the processing device 20 can set a prohibited area where at the mine the entry of the dump truck 2 is prohibited. The travel route generation unit of the processing device 20 can generate a travel route where the dump truck 2 runs. The processing device 20 includes a travel control unit 20D. The travel control unit 20D controls the travel of the dump track 2 such that the dump truck 2 runs along the generated travel route. The control of the travel of the dump truck 2 includes control of operations of the dump truck 2. The operations of the dump truck 2 include at least one of steering, acceleration, and brake operations. The processing device 20 may not include the data processing unit, the prohibited area setting unit, and the travel route generation unit.

The storage device 25 is mounted in the dump truck 2. The storage device 25 is connected to the processing device 20. The storage device 25 includes at least one of a RAM (Random Access Memory), a ROM (Read Only Memory), a flash memory, and a hard disk drive. The storage device 25 stores various pieces of information on the management of the dump truck 2. The storage device 25 includes a database 25B where information is registered. The storage device 25 stores a computer program for causing the processing device 20 to execute various processes. The storage device 25 can store (register) information equivalent to that of the storage device 13 placed in the control facility 7.

The communication system 9 includes the wireless communication device 28. The wireless communication device 28 is placed in the dump truck 2. The wireless communication device 28 is connected to the processing device 20. The wireless communication device 28 includes the antenna 28A. The wireless communication device 28 can receive information (including an instruction signal) transmitted from at least one of the control apparatus 10 and the vehicle 3. The information received by the wireless communication device 28 is output to the processing device 20. The information received by the wireless communication device 28 is stored (registered) in the storage device 25. The processing device 20 (the travel control unit 20D) can control the travel of the dump track 2 in accordance with the instruction signal received by the wireless communication device 28. The instruction signal includes information on a travel route, and information on a travel speed of the dump truck 2. The wireless communication device 28 can transmit information to at least one of the control apparatus 10 and the vehicle 3.

The position detection device 29 is placed in the dump truck 2. The position detection device 29 is connected to the processing device 20. The position detection device 29 includes a GPS receiver, and detects the position (GPS position) of the dump truck 2. The position detection device 29 includes the GPS antenna 29A. The position detection device 29 detects the position (GPS position) of the antenna 29A. The antenna 29A is placed on the dump truck 2. The position (GPS position) of the antenna 29A is detected to detect the position (GPS position) of the dump truck 2. The antenna 29A receives radio waves from the GPS satellites 5. The antenna 29A outputs to the position detection device 29 signals based on the received radio waves. The position detection device 29 detects the position (GPS position) of the antenna 29A based on the signals from the antenna 29A. The position detection device 29 converts into electrical signals the signals based on the radio waves received from the GPS satellites 5 by the antenna 29A and calculates the position (GPS position) of the antenna 29A. The GPS position of the antenna 29A is calculated to obtain the GPS position of the dump truck 2.

<Vehicle>

Figure 5:
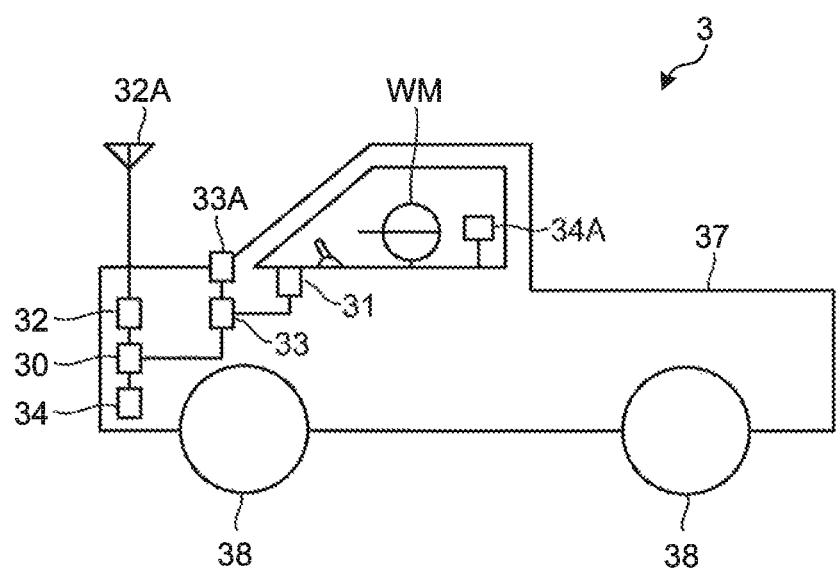
FIG. 5 is a diagram illustrating an example of a vehicle according to the embodiment.
Figure 6:
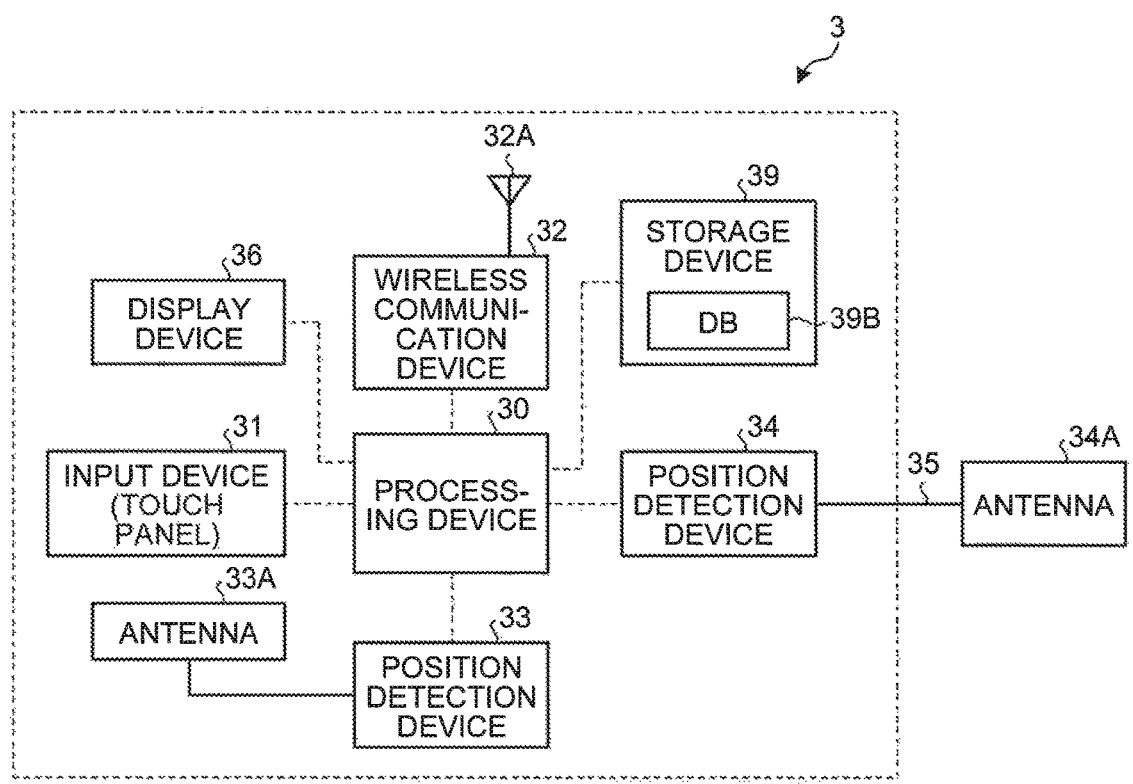
FIG. 6 is a diagram illustrating an example of a control system of the vehicle according to the embodiment.

Next, the vehicle 3 will be described. FIG. 5 is a diagram schematically illustrating the appearance of the vehicle 3 according to the embodiment. FIG. 6 is a control block diagram of the vehicle 3 according to the embodiment.

As illustrated in FIGS. 5 and 6, the vehicle 3 includes a vehicle body 37, wheels 38, a processing device 30, a storage device 39, a wireless communication device 32 to which an antenna 32A is connected, a position detection device 33 to which an antenna 33A is connected, a display device 36, and an input device 31.

An engine is placed in the vehicle body 37. The wheels 38 rotate with the power transmitted from the engine of the vehicle body 37. The wheel 38 includes a tire and a wheel. The wheels 38 rotate to cause the vehicle 3 to run. In the embodiment, a worker WM rides in the vehicle 3. The driving operation of the worker WM causes the vehicle 3 to run.

The processing device 30 includes a CPU (Central Processing Unit). The processing device 30 executes various processes related to the management of the dump truck 2. The processing device 30 includes a data processing unit, a prohibited area setting unit, and a travel route generation unit, and can execute processes equivalent to those of the processing device 12 placed in the control facility 7 and those of the processing device 20 placed in the dump truck 2. In other words, the data processing unit of the processing device 30 can process information on the position of the dump truck 2, information on the position of the vehicle 3, and information on the position of the landmark 8, the information having been acquired via the communication system 9. The prohibited area setting unit of the processing device 30 can set a prohibited area where at the mine the entry of the dump truck 2 is prohibited. The travel route generation unit of the processing device 30 can generate a travel route where the dump truck 2 runs. The processing device 30 may not include the data processing unit, the prohibited area setting unit, and the travel route generation unit.

The storage device 39 is mounted in the vehicle 3. The storage device 39 is connected to the processing device 30. The storage device 39 includes at least one of a RAM (Random Access Memory), a ROM (Read Only Memory), a flash memory, and a hard disk drive. The storage device 39 stores various pieces of information on the management of the dump truck 2. The storage device 39 includes a database 39B where information is registered. The storage device 39 stores a computer program for causing the processing device 30 to execute various processes. The storage device 39 can store (register) information equivalent to that of the storage device 13 placed in the control facility 7 and that of the storage device 25 placed in the dump truck 2.

The display device 36 includes a flat panel display such as a liquid crystal display. The display device 36 can display information on the position of the dump truck 2, information on the position of the vehicle 3, and information on the position of the landmark 8.

The input device 31 includes at least one of a keyboard, a touch panel, and a mouse. The input device 31 functions as an operating unit that can input an operation signal into the processing device 30. The worker (driver) WM of the vehicle 3 can input an operation signal into the processing device 30 by operating the input device 31.

The communication system 9 includes the wireless communication device 32. The wireless communication device 32 is placed in the vehicle 3. The wireless communication device 32 is connected to the processing device 30. The wireless communication device 32 includes the antenna 32A. The wireless communication device 32 can receive information (including an instruction signal) transmitted from at least one of the control apparatus 10 and the dump truck 2. The information received by the wireless communication device 32 is output to the processing device 30. The information received by the wireless communication device 32 is stored (registered) in the storage device 39. The wireless communication device 32 can transmit information to at least one of the control apparatus 10 and the dump truck 2.

The position detection device 33 is placed in the vehicle 3. The position detection device 33 is connected to the processing device 30. The position detection device 33 includes a GPS receiver, and detects the position (GPS position) of the vehicle 3. The position detection device 33 includes the GPS antenna 33A. The position detection device 33 detects the position (GPS position) of the antenna 33A. The antenna 33A is placed on the vehicle 3. The position (GPS position) of the antenna 33A is detected to detect the position (GPS position) of the vehicle 3. The antenna 33A receives radio waves from the GPS satellites 5. The antenna 33A outputs to the position detection device 33 signals based on the received radio waves. The position detection device 33 detects the position (GPS position) of the antenna 33A based on the signals from the antenna 33A. The position detection device 33 converts into electrical signals the signals based on the radio waves received from the GPS satellites 5 by the antenna 33A and calculates the position (GPS position) of the antenna 33A. The GPS position of the antenna 33A is calculated to obtain the GPS position of the vehicle 3.

In the embodiment, a GPS antenna 34A is mounted on the vehicle 3. The antenna 34A receives radio waves from the GPS satellites 5. The antenna 34A is mounted in a releasable manner in the vehicle 3. The antenna 34A released from the vehicle 3 can be moved to the outside of the vehicle 3. The antenna 34A can be moved to a position away from the vehicle 3. The antenna 34A is portable. The worker WM can carry (hold) the antenna 34A. The worker WM can move to the outside of the vehicle 3 holding the antenna 34A. The worker WM can move to a position away from the vehicle 3 holding the antenna 34A. The antenna 34A can receive radio waves from the GPS satellites 5 while being placed outside the vehicle 3.

A position detection device 34 is placed in the vehicle 3. The position detection device 34 is connected to the processing device 30. The position detection device 34 includes a GPS receiver. The position detection device 34 and the antenna 34A are connected via a cable 35. The position detection device 34 detects the position (GPS position) of the antenna 34A. If the worker WM is carrying the antenna 34A, the position (GPS position) of the antenna 34A is detected to detect the position (GPS position) of the worker WM. If the antenna 34A is placed in the vicinity of an object, the position (GPS position) of the antenna 34A is detected to detect the position (GPS position) of the object. The antenna 34A receives radio waves from the GPS satellites 5. The antenna 34A outputs signals based on the received radio waves to the position detection device 34 via the cable 35. The position detection device 34 detects the position (GPS position) of the antenna 34A based on the signals from the antenna 34A. The position detection device 34 converts into electrical signals the signals based on the radio waves received from the GPS satellites 5 by the antenna 34A and calculates the position (GPS position) of the antenna 34A. The GPS position of the antenna 34A is calculated to obtain the GPS position of the object (including the worker WM) situated in the vicinity of the antenna 34A.

<Method of Use of Landmark>

Figure 7:
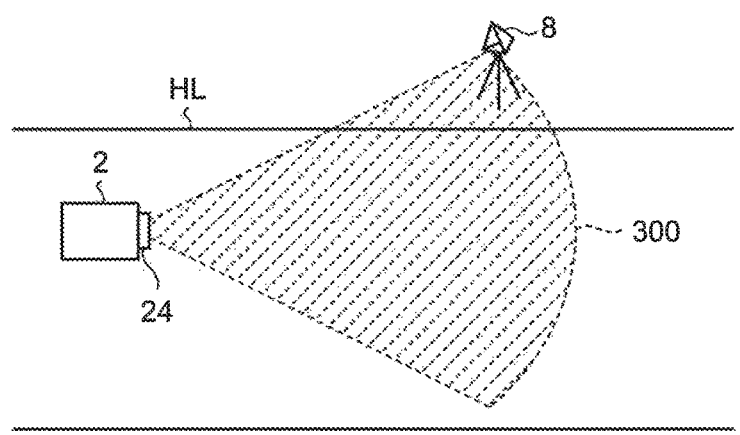
FIG. 7 is a diagram illustrating an example of the method of use of a landmark according to the embodiment.

Next, a method of use of the landmark 8 will be described. FIG. 7 is a diagram schematically illustrating an example of a state where the landmark 8 is being detected by the non-contact sensor 24 of the dump truck 2. The landmarks 8 are respectively placed at the load site LPA, the dump site DPA, and the haul road HL. For the haul road HL, the landmarks 8 are placed outside (at the shoulder of) the haul road HL. A plurality of the landmarks 8 is spaced out along the haul road HL. The landmarks 8 may be placed, for example, at intervals of 100 m.

The landmark 8 is a stationary object. The landmark 8 does not move from its installed position (place). The landmark 8 is a structure (feature) placed along the travel route. The landmark 8 is detected by the non-contact sensor 24 placed on the dump truck 2. The landmark 8 includes a reflecting portion (reflecting surface) that can reflect a radio wave emitted from the non-contact sensor 24. The reflectance (reflection intensity) of the reflecting portion of the landmark 8 with respect to a radio wave is higher than the reflectance (reflection intensity) of an object around the landmark 8. The objects around the landmark 8 include at least one of a rock, the running dump truck 2, and the vehicle 3 at the mine.

The non-contact sensor 24 includes a radar. The non-contact sensor 24 includes an emission unit that can emit a radio wave and a receiving unit that can receive a radio wave. The non-contact sensor 24 is placed at the front of the dump truck 2. At least part of the radio wave emitted from the emission unit of the non-contact sensor 24 and irradiated to the landmark 8 is reflected from the reflecting portion of the landmark 8. The non-contact sensor 24 receives, at the receiving unit, the radio wave reflected from the reflecting portion of the landmark 8. The non-contact sensor 24 receives the radio wave from the landmark 8 and detects the relative positions of the non-contact sensor 24 and the landmark 8. The non-contact sensor 24 is fixed to the dump truck 2. The relative positions of the non-contact sensor 24 and the landmark 8 are detected to detect the relative positions of the dump truck 2 and the landmark 8. The relative position of the landmark 8 with respect to the dump truck 2 is detected by the non-contact sensor 24 placed on the dump truck 2.

In the embodiment, the radio wave from the non-contact sensor 24 propagates so as to expand from the emission portion of the non-contact sensor 24. The landmark 8 is placed in a propagation area (propagation space) where the radio wave emitted from the non-contact sensor 24 propagates, which enables the non-contact sensor 24 to detect the landmark 8. Moreover, the radio wave emitted from the non-contact sensor 24 attenuates as it travels. In other words, the intensity of the radio wave emitted from the non-contact sensor 24 decreases as the radio wave travels. The landmark 8 is placed in the propagation area (propagation space) where the radio wave emitted from the non-contact sensor 24 propagates in a state of maintaining intensity equal to or more than a predetermined value, which enables the non-contact sensor 24 to detect the landmark 8. In the following description, the radio wave propagation area (propagation space) where the non-contact sensor 24 can detect the landmark 8 based on the radio wave emitted from the non-contact sensor 24 is referred to as a detection area (detection space) 300 of the non-contact sensor 24 as appropriate. The landmark 8 is placed in the detection area 300 of the non-contact sensor 24 to enable the non-contact sensor 24 to detect the landmark 8.

The non-contact sensor 24 may detect the landmark 8 using detection light (laser light). In other words, the non-contact sensor 24 may include a radiation unit that can radiate the detection light, and a receiving unit that can receive at least part of the detection light radiated from the radiation unit and then reflected from the landmark 8. The landmark 8 is placed in an irradiation area (irradiation space) where the detection light radiated from the non-contact sensor 24 is irradiated, which enables the non-contact sensor 24 to detect the landmark 8. Moreover, the detection light radiated from the non-contact sensor 24 attenuates as it travels. The landmark 8 is placed in the irradiation area (irradiation space) where the detection light radiated from the non-contact sensor 24 is irradiated in a state of maintaining intensity equal to or more than a predetermined value, which enables the non-contact sensor 24 to detect the landmark 8. If the non-contact sensor 24 detects the landmark 8 with the detection light, the detection area 300 of the non-contact sensor 24 includes the detection light irradiation area (irradiation space) where the landmark 8 can be detected based on the detection light radiated from the non-contact sensor 24.

In the embodiment, GPS (Global Positioning System) is used to detect the position (GPS position, absolute position) of the landmark 8. The GPS position of the landmark 8, which was detected using GPS, is registered in the storage device 13 of the control apparatus 10. Moreover, information on the relative positions of the dump truck 2 and the landmark 8, which were detected using the non-contact sensor 24, is transmitted to the control apparatus 10 (the processing device 12) via the communication system 9. The processing device 12 can obtain the absolute position (GPS position) of the dump truck 2 based on the information on the relative positions of the dump truck 2 and the landmark 8 detected using the non-contact sensor 24, and information on the absolute position (GPS position) of the landmark 8 registered (stored) in the storage device 13.

The GPS position of the landmark 8 detected using GPS may be registered in the storage device 25 of the dump truck 2. The processing device 20 of the dump truck 2 may obtain the absolute position (GPS position) of the dump truck 2 based on the information on the relative positions of the dump truck 2 and the landmark 8 detected using the non-contact sensor 24, and the information on the absolute position (GPS position) of the landmark 8 registered (stored) in the storage device 25.

<Traveling Method of Dump Truck>

Next, an example of a traveling method of the dump truck 2 according to the embodiment will be described. The processing device 12 transmits an instruction signal to the processing device 20 (the travel control unit 20D) of the dump truck 2 via the communication system 9 (the wireless communication device 18 and the wireless communication device 28). The instruction signal includes information on travel conditions of the dump truck 2. The information on the travel conditions include information on a travel route generated by the processing device 12, and information on the travel speed of the dump truck 2. The processing device 20 (the travel control unit 20D) controls operations (at least one of steering, acceleration, and brake operations) of the dump truck 2 based on the instruction signal transmitted from the processing device 12 via the communication system 9, and controls the travel of the dump truck 2.

An example where the dump truck 2 runs based on dead reckoning will be described. In the embodiment, the dump truck 2 runs on at least parts of the load site LPA, the dump site DPA, and the haul road HL in accordance with the travel conditions including a travel route generated by the processing device 12 of the control apparatus 10, and a travel speed (target travel speed) set by the processing device 12. In the embodiment, the processing device 20 causes the dump truck 2 to run on at least parts of the mine in accordance with the generated travel route while estimating the current position of the dump truck 2 using dead reckoning. Dead reckoning is navigation that estimates the current position of an object (the dump truck 2) based on a direction (amount of directional change) and a travel distance relative to a starting point whose longitude and latitude are known. The direction (amount of directional change) of the dump truck 2 is detected using the gyro sensor 26 placed in the dump truck 2. The travel distance of the dump truck 2 is detected using the speed sensor 27 placed in the dump truck 2. A detection signal of the gyro sensor 26 and a detection signal of the speed sensor 27 are output to the processing device 20 of the dump truck 2. The processing device 20 can obtain the direction (amount of directional change) of the dump truck 2 from the known starting point based on the detection signal from the gyro sensor 26. The processing device 20 can obtain the travel distance of the dump truck 2 from the known starting point based on the detection signal from the speed sensor 27. The processing device 20 calculates control amounts of the travel of the dump truck 2 based on the detection signals from the gyro sensor 26 and the speed sensor 27 so as to cause the dump truck 2 to run along the generated travel route. The control amounts include a steering amount (steering instruction) and a travel speed adjustment amount (speed instruction). The processing device 20 controls the travel (operation) of the dump truck 2 based on the calculated control amounts so as to cause the dump truck 2 to run along the travel route.

Next, a description will be given of an example where the dump truck 2 runs while an estimated position obtained by dead reckoning is corrected using GPS. As the travel distance of the dump truck 2 increases, an error may be caused between an estimated position (estimated position) and an actual position due to the accumulation of detection errors of one or both of the gyro sensor 26 and the speed sensor 27. As a consequence, the dump truck 2 may run off the travel route generated by the processing device 12. In the embodiment, the processing device 20 causes the dump truck 2 to run while correcting the position (estimated position) of the dump truck 2 derived (estimated) by dead reckoning with information on the position (GPS position) of the dump truck 2 detected by the position detection device 29. The processing device 20 calculates the control amounts of the travel of the dump truck 2, the control amounts including a correction amount for correcting the position of the dump truck 2, based on the detection signal from the gyro sensor 26, the detection signal from the speed sensor 27, and the information on the GPS position of the dump truck 2 from the position detection device 29 so as to cause the dump truck 2 to run along the travel route. The processing device 20 controls the travel (operation) of the dump truck 2 based on the calculated correction amount and control amounts so as to cause the dump truck 2 to run along the travel route.

Next, a description will be given of an example where the dump truck 2 runs while the estimated position obtained by dead reckoning is corrected using the landmark 8. There may arise, at the mine, states where detection accuracy (position determination accuracy) by GPS is reduced and where detection (position determination) by GPS becomes impossible. For example, if the antenna 29A cannot fully receive radio waves from the GPS satellites 5 at the mine due to the influence of an obstacle, or if the number of the GPS satellites 5 from which the antenna 29A can receive radio waves is small, there may arise states where detection accuracy by GPS is reduced, and where detection by GPS becomes impossible. In the embodiment, if it is difficult to correct the estimated position obtained by dead reckoning using GPS, the processing device 20 makes a correction using the landmark 8. In other words, if a correction of the estimated position using GPS is not made, the processing device 20 corrects the position (estimated position) of the dump truck 2 obtained by dead reckoning, using information on the position (GPS position, absolute position) of the dump truck 2 detected using the landmark 8 and the non-contact sensor 24.

Figure 8:
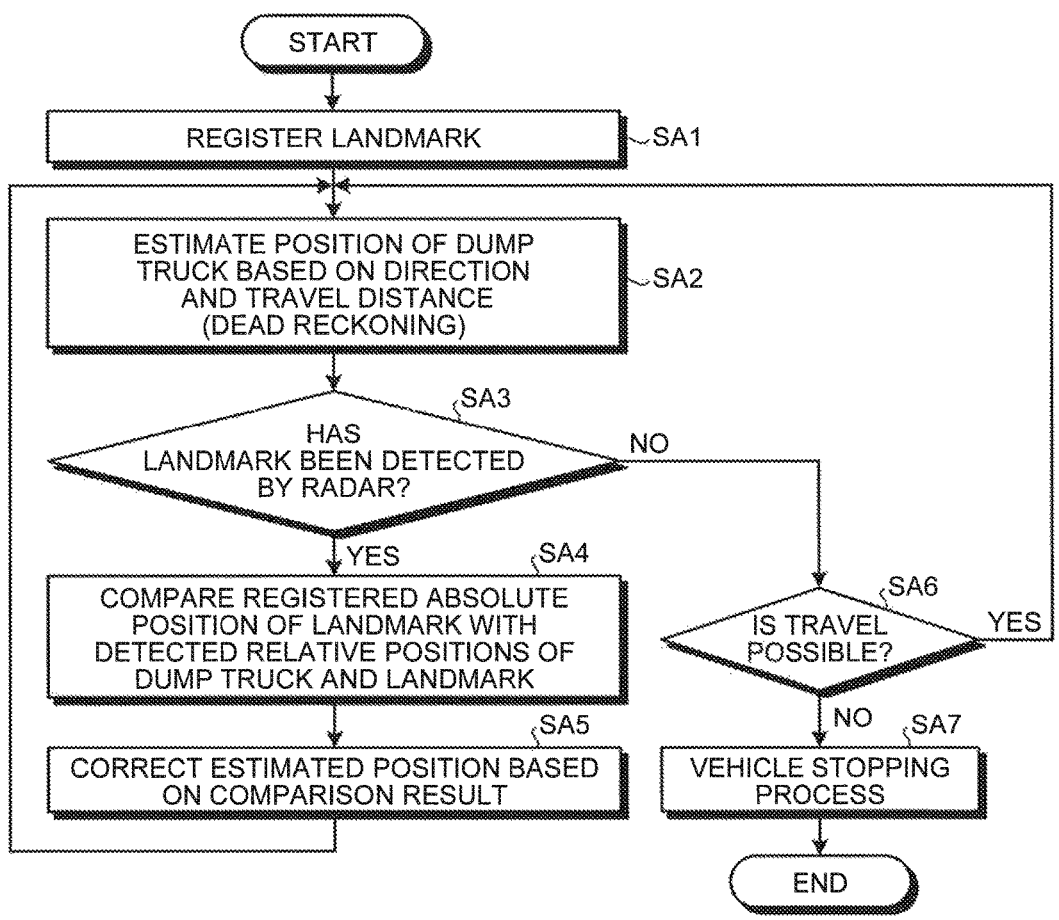
FIG. 8 is a flowchart illustrating an example of a traveling method of the dump truck according to the embodiment.

FIG. 8 is a flowchart illustrating an example of a traveling method of the dump truck 2 including the correction of the estimated position using the landmark 8 and the non-contact sensor 24. Prior to the operation of the dump truck 2, a plurality of the landmarks 8 is installed at the load site LPA, the dump site DPA, and the haul road HL. The positions (GPS positions, absolute positions) of the plurality of the landmarks 8 are respectively detected using GPS. Information on the positions (GPS positions) of the landmarks 8 detected using GPS is registered (stored) in the storage device 13 (step SA1). The information on the positions of the landmarks 8 may be transmitted to the dump truck 2 via the communication system 9 and registered (stored) in the storage device 25. The installation of the landmarks 8 and the detection of the positions of the landmarks 8 using GPS may be performed concurrently with the operation of the dump truck 2.

The processing device 20 causes the dump truck 2 to run based on dead reckoning (step SA2). In other words, the processing device 20 causes the dump truck 2 to run while estimating the position of the dump truck 2 based on the direction (amount of directional change) of the dump truck 2 obtained from a detection signal from the gyro sensor 26 and the travel distance of the dump truck 2 obtained from a detection signal from the speed sensor 27.

Radio waves are emitted from the non-contact sensor 24 during the travel of the dump truck 2. Detection signals of the non-contact sensor 24 are output to the processing device 20. The processing device 20 determines whether or not the landmark 8 has been detected based on the detection signals from the non-contact sensor 24 (step SA3).

If determining in step SA3 that the landmark 8 has been detected, the processing device 20 compares the absolute positions (GPS positions) of the landmarks 8 registered in step SA1 with the relative positions of the dump truck 2 and the landmark 8 detected using the non-contact sensor 24 (step SA4). The absolute position (GPS position) of the dump truck 2 is derived based on information on the relative positions of the dump truck 2 and the landmark 8 detected using the non-contact sensor 24 and information on the registered (stored) absolute positions of the landmarks 8.

When the absolute position of the dump truck 2 is derived based on the registered absolute positions of the landmarks 8 and the relative positions of the dump truck 2 and the landmark 8 detected using the non-contact sensor 24, the processing device 20 extracts information on the position (absolute position) of the landmark 8 corresponding to the landmark 8 detected by the non-contact sensor 24 from the plurality of the landmarks 8 registered in the storage device 13 (the storage device 25). Out of the plurality of the registered landmarks 8, the landmark 8 corresponding to the landmark 8 detected by the non-contact sensor 24 includes the landmark 8 existing at the closest position (GPS position) to the position (estimated position) of the dump truck 2 derived based on dead reckoning when the landmark 8 was detected using the non-contact sensor 24, among the plurality of the registered landmarks 8. Out of the plurality of the registered landmarks 8, the landmark 8 corresponding to the landmark 8 detected by the non-contact sensor 24 includes the landmark 8 determined to be placeable in the detection area 300 of the non-contact sensor 24 of the dump truck 2 existing at the position (estimated position) derived based on dead reckoning among the plurality of the registered landmarks 8. For example, the processing device 20 extracts, from the plurality of the registered landmarks 8, the landmark 8 existing at the closest position (GPS position) to the position (estimated position) of the dump truck 2 derived based on dead reckoning when the landmark 8 was detected using the non-contact sensor 24. The landmarks 8 are placed, for example, at intervals of 100 m. The size of the detection area 300 of the non-contact sensor 24 with respect to the travel direction of the dump truck 2 is, for example, 50 m. Hence, the processing device 20 can extract information on the position (absolute position) of the landmark 8 corresponding to the landmark 8 detected by the non-contact sensor 24, from the plurality of the registered landmarks 8.

The processing device 20 corrects the position (estimated position) of the dump truck 2 based on the result of the comparison in step SA4 (step SA5). For example, if determining that the position of the dump truck 2 deviates from the travel route generated by the processing device 12, the processing device 20 corrects the position of the dump truck 2 so as to cause the dump truck 2 to run along the travel route. In other words, the processing device 20 calculates the control amounts of the travel of the dump truck 2, including the correction amount for correcting the position of the dump truck 2, based on a detection signal from the gyro sensor 26, a detection signal from the speed sensor 27, information on the relative positions of the dump truck 2 and the landmark 8 detected using the non-contact sensor 24, and information on the absolute positions (GPS positions) of the landmarks 8 stored in the storage device 13 (the storage device 25) so as to cause the dump truck 2 to run along the travel route. The processing device 20 (the travel control unit 20D) controls the travel (operation) of the dump truck 2 based on the calculated correction amount and control amounts so as to cause the dump truck 2 to run along the travel route.

If it is determined in step SA3 that the landmark 8 has not been detected, it is determined whether or not travel is possible by dead reckoning alone without using a detection result of the landmark 8 (step SA6). If a travel distance from a position obtained by correcting the previous estimated position of the dump truck 2 (using one or both of GPS and the landmark 8) is within a predetermined distance, the processing device 20 determines that an error in the estimated position obtained by dead reckoning alone does not matter, and continues the travel of the dump truck 2 based on dead reckoning (step SA2). The predetermined distance is a distance where travel from the position obtained by correcting the estimated position is possible without deviating greatly from the travel route, and is a distance determined in advance. On the other hand, if it is determined in step SA6 that travel is not possible by dead reckoning alone, a stopping process (vehicle stopping process) of the dump truck 2 is performed until position detection by GPS becomes possible (step SA7).

In the embodiment, the example has been described where the processing device 20 of the dump truck 2 controls the travel of the dump truck 2. The control apparatus 10 (the processing device 12) may control the travel (operation) of the dump truck 2 based on a detection signal of the gyro sensor 26 and a detection signal of the speed sensor 27 so as to cause the dump truck 2 to run by dead reckoning on the generated travel route. The processing device 12 may correct the position (estimated position) of the dump truck 2 obtained by dead reckoning based on the detection result of the position detection device 29. The processing device 12 may correct the position (estimated position) of the dump truck 2 obtained by dead reckoning based on the detection result of the non-contact sensor 24.

<Example of Position Detection Process and Position Registration Process of Landmark>

Next, a description will be given of an example of the position detection process and the position registration process (the process in step SA1 in FIG. 8) of the landmark 8. The position detection process of the landmark 8 is a process of detecting the GPS position of the landmark 8. The position registration process of the landmark 8 is a process of registering (storing) the detected GPS position (information on the GPS position) of the landmark 8 in the storage device 13 (the database 13B). The GPS position of the landmark 8 may be registered in the storage device 25 (the database 25B) of the dump truck 2.

Figure 9:
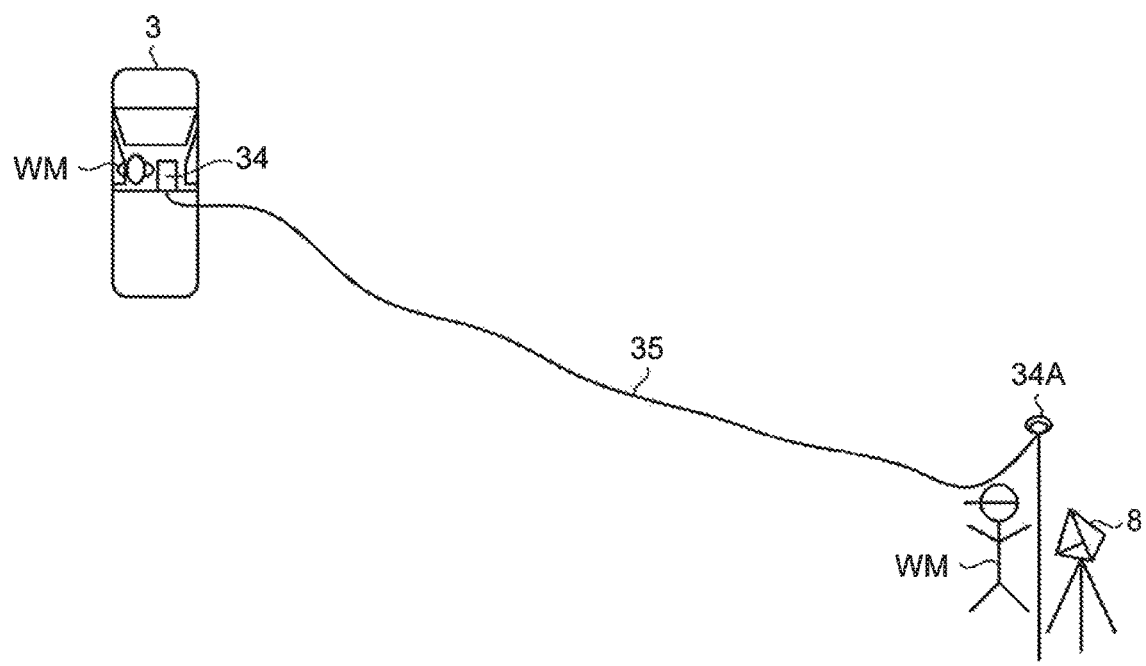
FIG. 9 is a schematic diagram illustrating an example of a position detection process and a position registration process of the landmark according to the embodiment.

FIG. 9 is a diagram illustrating an example of the position detection process and the position registration process of the landmark 8 according to the embodiment. The position (GPS position) of the landmark 8 installed at the mine is detected using GPS. As illustrated in FIG. 9, the position of the landmark 8 is detected using the GPS antenna 34A.

The vehicle 3 manned by the worker WM moves to the vicinity of the landmark 8 targeted for position detection and position registration. The vehicle 3 moves to the vicinity of the landmark 8 targeted for position detection and position registration with the antenna 34A mounted on the vehicle 3. The vehicle 3 moves (runs) by the driving operation of the worker WM.

The antenna 34A carried (held) by the worker WM is moved to the outside of the vehicle 3. The worker WM moves to the outside of the vehicle 3 carrying (holding) the antenna 34A. The antenna 34A is carried (held) by the worker WM and brought out from the vehicle 3. The position detection device 34 is situated inside the vehicle 3. The antenna 34A and the position detection device 34 are connected via the cable 35.

As illustrated in FIG. 9, the antenna 34A is installed in the vicinity of the landmark 8 installed at the mine. The antenna 34A is installed in the vicinity of the landmark 8 by the worker WM. The antenna 34A is held by the worker WM. The antenna 34A receives radio waves from the GPS satellites 5 while being situated outside the vehicle 3. Signals based on the radio waves received from the GPS satellites 5 by the antenna 34A are output to the position detection device 34 via the cable 35. The position detection device 34 detects the position (GPS position) of the antenna 34A based on the signals from the antenna 34A. As illustrated in FIG. 9, the antenna 34A outputs to the position detection device 34 the signals based on the radio waves from the GPS satellites 5 while being installed in the vicinity of the landmark 8. Therefore, the position detection device 34 obtains the GPS position of the antenna 34A to obtain the GPS position of the landmark 8. Moreover, as illustrated in FIG. 9, not only the landmark 8 but also the worker WM exists in the vicinity of the antenna 34A. Therefore, the position detection device 34 obtains the GPS position of the antenna 34A to also obtain the GPS position of the worker WM. In other words, in the embodiment, the position detection device 34 simultaneously detects the GPS position of the antenna 34A, the GPS position of the landmark 8, and the GPS position of the worker WM.

Information based on the signals from the antenna 34A is transmitted to the wireless communication device 18 of the control apparatus 10 by the wireless communication device 32 mounted in the vehicle 3. In the embodiment, the information on the signals from the antenna 34A includes information on the position (GPS position) of the antenna 34A, information on the position (GPS position) of the landmark 8, and information on the position (GPS position)

of the worker WM, the positions having been detected by the position detection device 34 based on the signals from the antenna 34A. The processing device 30 of the vehicle 3 transmits from the wireless communication device 32 the information on the position of the antenna 34A, the information on the position of the landmark 8, and the information on the position of the worker WM. The wireless communication device 18 of the control apparatus 10 receives the information from the wireless communication device 32 of the vehicle 3. The processing device 12 of the control apparatus 10 processes the information on the positions transmitted from the vehicle 3 via the communication system 9 including the wireless communication devices 32 and 18. The processing device 12 registers in the storage device 13 (the database 13B) the information on the position (GPS position) of the landmark 8 obtained using the antenna 34A.

<Position Detection Process and Position Registration Process of Landmark Including Setting of Prohibited Area>

Next, a description will be given of an example where in the position detection process of the landmark 8 described with reference to FIG. 9, a prohibited area 100 where the entry of the dump truck 2 is prohibited is set so as to include the position of the antenna 34A, and in the position registration process of the landmark 8, a prohibited area 200 where the entry of the dump truck 2 is prohibited is set so as to include the position of the landmark 8.

As described with reference to FIG. 9, the worker WM carries out work outside the vehicle 3 in the position detection process of the landmark 8. When the worker WM carries out work outside the vehicle 3 during the operation of the dump truck 2, the work of the worker WM may not be carried out smoothly. For example, if the dump truck 2 approaches the worker WM during the execution of work, the worker WM may need to stop the work. As a consequence, productivity and working efficiency at the mine may be reduced. Moreover, also from the viewpoint of securing the safety of the worker WM, a hindrance to the work may be caused. On the other hand, if the operation of the dump truck 2 is stopped while the worker WM is working, productivity at the mine may be reduced.

In the embodiment, the prohibited area 100 (see FIG. 11) where the entry of the dump truck 2 is prohibited is set so as to include the position of the antenna 34A. Consequently, a reduction of productivity at the mine is suppressed.

Figure 10:
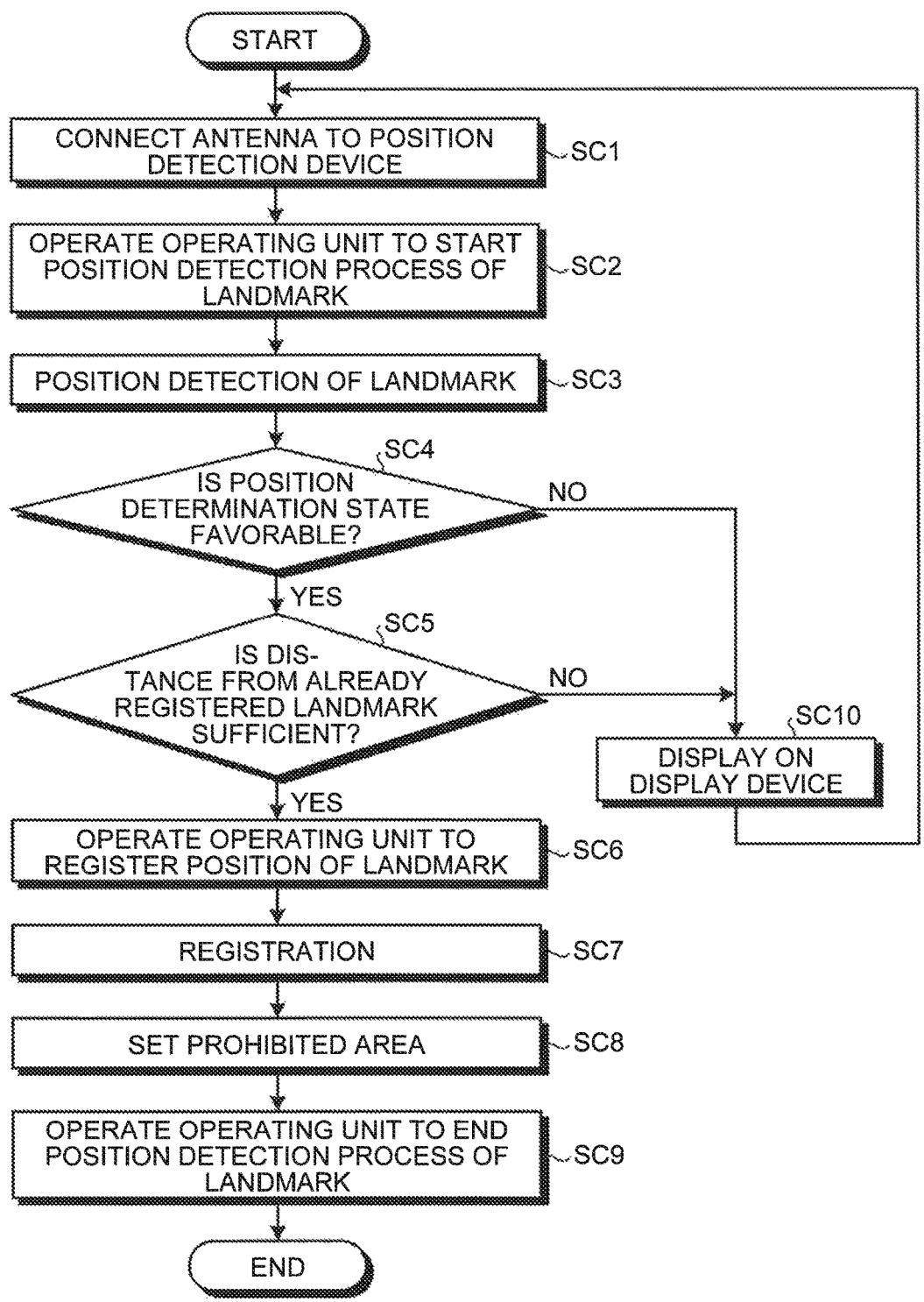
FIG. 10 is a flowchart illustrating an example of the position detection process and the position registration process of the landmark according to the embodiment.
Figure 11:
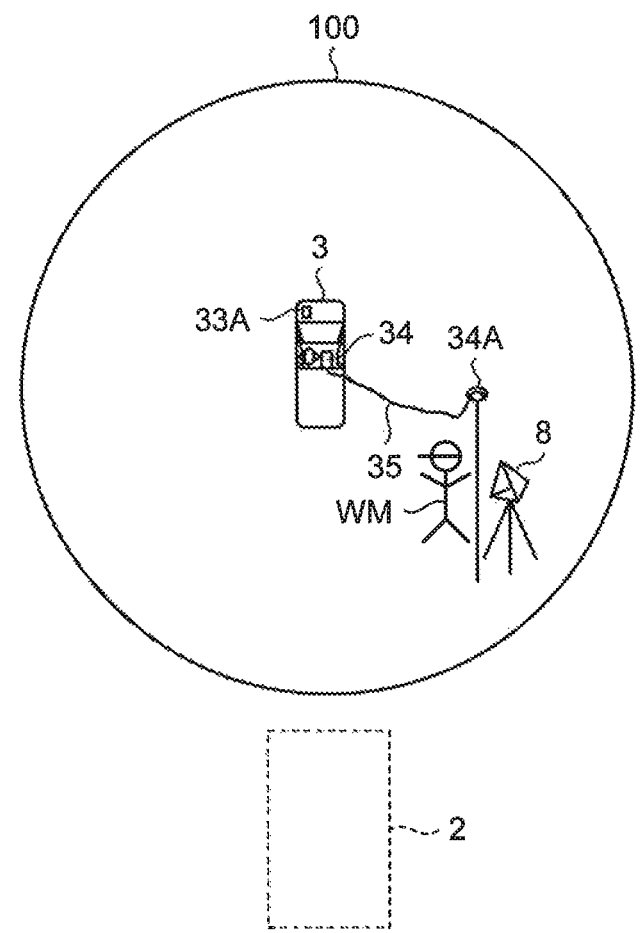
FIG. 11 is a diagram illustrating an example of a prohibited area according to the embodiment.

FIG. 10 is a flowchart illustrating an example of the position detection process and the position registration process of the landmark 8 according to the embodiment. FIG. 11 is a schematic diagram illustrating an example of the prohibited area 100 according to the embodiment.

The vehicle 3 manned by the worker WM moves to the vicinity of the landmark 8 for the position detection process and the position registration process of the landmark 8. Prior to the position detection process and the position registration process of the landmark 8, the antenna 34A and the position detection device 34 are connected via the cable 35 (step SC1).

Prior to the position detection process and the position registration process of the landmark 8, the antenna 33A placed on the vehicle 3 continues to receive radio waves from the GPS satellites 5. The position detection device 33 detects the position (GPS position) of the antenna 33A based on signals from the antenna 33A. Moreover, prior to the position detection process and the position registration process of the landmark 8, the antenna 34A mounted in the vehicle 3 continues to receive radio waves from the GPS satellites 5. The position detection device 34 detects the position (GPS position) of the antenna 34A based on signals from the antenna 34A. Information on the position (GPS position) of the antenna 33A detected by the position detection device 33, and information on the position (GPS position) of the antenna 34A detected by the position detection device 34 are output to the processing device 30. The processing device 30 transmits from the wireless communication device 32 the information on the position (GPS position) of the antenna 33A detected by the position detection device 33, and the information on the position (GPS position) of the antenna 34A detected by the position detection device 34. The wireless communication device 32 mounted in the vehicle 3 transmits to the wireless communication device 18 of the control apparatus 10 the information on the position (GPS position) of the antenna 33A detected by the position detection device 33, and the information on the position (GPS position) of the antenna 34A detected by the position detection device 34. The wireless communication device 18 of the control apparatus 10 receives the information on the GPS position of the antenna 33A and the information on the GPS position of the antenna 34A from the wireless communication device 32, and outputs the information to the processing device 12. Consequently, the processing device 12 acquires the information on the GPS position of the antenna 33A and the information on the GPS position of the antenna 34A.

Prior to going out of the vehicle 3, the worker WM operates the input device 31 placed in the vehicle 3. The worker WM operates the input device 31 prior to performing the position detection process of the landmark 8 outside the vehicle 3. The input device 31 functions as the operating unit that can input an operation signal into the processing device 30. The worker WM operates the input device 31 to start the position detection process of the landmark 8 (step SC2). In the embodiment, the input device 31 includes a touch panel. The touch panel includes a start button for instructing the processing device 30 to start the position detection process of the landmark 8. In the embodiment, the operating unit includes the start button. The worker WM presses (operates) the start button.

The operating unit (start button) of the input device 31 is operated to input an operation signal into the processing device 30. The processing device 30 transmits, from the wireless communication device 32, the operation signal input from the operating unit of the input device 31. The wireless communication device 18 of the control apparatus 10 receives the operation signal from the wireless communication device 32 and outputs the operation signal to the processing device 12. The processing device 12 acquires the operation signal from the input device 31, and then sets the prohibited area 100 where the entry of the dump truck 2 is prohibited so as to include the position of the antenna 34A. In the embodiment, the processing device 12 may simultaneously perform the acquisition of the operation signal from the input device 31 and the setting of the prohibited area 100. The processing device 12 may set the prohibited area 100 after a lapse of a predetermined time (for example, after a lapse of one second) since the acquisition of the operation signal from the input device 31.

The processing device 12 sets the prohibited area 100 based on the detection result of the position detection device 34 acquired via the communication system 9 so as to include the position of the antenna 34A. The position detection device 34 detects the GPS position of the antenna 34A. The processing device 12 can set the prohibited area 100 based on the GPS coordinate system so as to include the GPS position of the antenna 34A.

As described above, prior to going out of the vehicle 3, the worker WM operates the input device 31 placed in the vehicle 3. In the embodiment, the prohibited area 100 is set before the worker WM goes out of the vehicle 3 (while the worker WM is inside the vehicle 3). In the embodiment, the prohibited area 100 is set in the state where the antenna 34A is mounted in the vehicle 3 (in the state where the antenna 34A is placed inside the vehicle 3).

In the embodiment, the prohibited area 100 where the entry of the dump truck 2 is prohibited is set prior to the position detection process and the position registration process of the landmark 8 so as to include the position of the antenna 33A. The processing device 12 sets the prohibited area 100 based on the detection result of the position detection device 33 acquired via the communication system 9 so as to include the position of the antenna 33A. The position detection device 33 detects the GPS position of the antenna 33A. The processing device 12 can set the prohibited area 100 based on the GPS coordinate system so as to include the GPS position of the antenna 33A. The processing device 12 sets the prohibited area 100 such that the antenna 33A and the vehicle 3 are situated in the prohibited area 100.

The processing device 12 transmits an instruction signal to the dump truck 2 via the communication system 9 to prevent the dump truck 2 from entering the prohibited area 100. The instruction signal is transmitted from the wireless communication device 18 placed in the control facility 7 to the wireless communication device 28 placed in the dump truck 2. The instruction signal includes information on travel conditions set so as to cause the running dump truck 2 to stop before the prohibited area 100 (so as to prevent the running dump truck 2 from entering the prohibited area 100). The wireless communication device 28 of the dump truck 2 receives the instruction signal from the wireless communication device 18 of the control apparatus 10 and outputs the instruction signal to the processing device 20. The processing device 20 (the travel control unit 20D) controls the travel (operation) of the dump truck 2 so as to prevent the dump truck 2 from entering the prohibited area 100. The prohibited area 100 is defined in the GPS coordinate system. The processing device 12 (the travel route generation unit 12C) generates a travel route in the GPS coordinate system. The processing device 20 controls the travel of the dump truck 2 based on the GPS position of the dump truck 2. In other words, the prohibited area 100, the position of the dump truck 2, and the travel route are respectively defined in the GPS coordinate system. Therefore, the processing device 12 can generate a travel route and determine travel speed so as to prevent the dump truck 2 from entering the prohibited area 100. The processing device 12 can transmit an instruction signal to the dump truck 2 so as to prevent the dump truck 2 from entering the prohibited area 100. The processing device 20 can control the dump truck 2 so as to prevent the dump truck 2 from entering the prohibited area 100.

In the embodiment, the prohibited area 100 is set so as to include the position of the antenna 33A fixed to the vehicle 3, whether the input device 31 is operated or not. The prohibited area 100 is continued to be set so as to include the position of the antenna 33A at least during the operation of the dump truck 2. The prohibited area 100 is set so as to include the position of the antenna 33A, whether the position detection process and the position registration process of the landmark 8 are performed or not. In the embodiment, when at least the vehicle 3 runs at the mine, the prohibited area 100 is set so as to include the position of the antenna 33A. The prohibited area 100 set so as to include the position of the antenna 33A is set so as to include the vehicle 3. The prohibited area 100 including the position of the antenna 33A and the position of the vehicle 3 is continued to be set also during the travel of the vehicle 3. Consequently, if the vehicle 3 runs at the mine, the dump truck 2 is prohibited from approaching the vehicle 3.

In other words, in the embodiment, the prohibited area 100 is set so as to include the position of the antenna 33A (the vehicle 3), prior to the operation of the input device 31. The prohibited area 100 is set so as to include both the position of the antenna 33A (the vehicle 3) and the position of the antenna 34A, subsequent to the operation of the input device 31.

In the embodiment, the travel condition (travel speed) of the dump truck 2 is set such that the dump truck 2 approaching the prohibited area 100 does not change the travel route but gradually decreases in travel speed and stops before the prohibited area 100. For example, the travel condition is set such that the travel route between the dump truck 2 and the prohibited area 100 is divided into a plurality of sections and the travel speed is gradually reduced in each section from the dump truck 2 toward the prohibited area 100.

The dump truck 2 may stop before the prohibited area 100 or may run skirting around the prohibited area 100. The dump truck 2 runs skirting around the prohibited area 100 to prevent the operation of the dump truck 2 from being stopped. Accordingly, a reduction in productivity at the mine is suppressed.

After the prohibited area 100 is set so as to include the position of the antenna 33A and the position of the antenna 34A, the position detection process of the landmark 8 is started (step SC3). The worker WM goes out of the vehicle 3 carrying (holding) the antenna 34A. The prohibited area 100 including the position of the antenna 34A is set so as to include the worker WM. Therefore, the worker WM, who has gone out of the vehicle 3, is situated in the prohibited area 100. Moreover, the antenna 34A is situated in the vicinity of the landmark 8 and accordingly the landmark 8 is situated in the prohibited area 100. In the embodiment, the antenna 34A, the landmark 8, and the worker WM are situated in the prohibited area 100.

FIG. 11 is a diagram illustrating an example of the prohibited area 100. In the example illustrated in FIG. 11, the prohibited area 100 is set as one area including both the position of the antenna 33A and the position of the antenna 34A. In the example illustrated in FIG. 11, the external shape of the prohibited area 100 is a circle. The external shape of the prohibited area 100 may be a polygon such as a rectangle. The antenna 33A, the vehicle 3, the antenna 34A, the landmark 8, and the worker WM are situated in the prohibited area 100. In the embodiment, the cable 35 is also situated in the prohibited area 100. The prohibited area 100 is defined based on the GPS coordinate system. Therefore, the prohibited area 100 is set to enable the processing device 12 to prohibit the dump truck 2 running based on the GPS coordinate system from entering the inside of the prohibited area 100. A portable GPS device with the built-in antenna 34A and position detection device 34 may be used to detect positional information. Both the antenna 34A and the position detection device 34 can be brought out from the vehicle 3 and accordingly the cable 35 can be omitted.

An instruction signal is transmitted from the communication system 9 to the processing device 20 of the dump truck 2 to prevent the dump truck 2 from entering the prohibited area 100. The processing device 20 controls the travel (operation) of the dump truck 2 to prevent the dump truck 2 from entering the prohibited area 100.

In the embodiment, the processing device 12 may change the size of the prohibited area 100 based on the relative positions of the antennas 33A and 34A. The worker WM holding the antenna 34A may move on the outside of the vehicle 3. The processing device 12 may change the size (dimension) of the prohibited area 100 based on the detection result of the position detection device 33 and the detection result of the position detection device 34 such that both of the vehicle 3 and the worker WM moving on the outside of the vehicle 3 are continued to be situated in the prohibited area 100. The processing device 12 updates the prohibited area 100 based on the positions of the antennas 33A and 34A such that the vehicle 3 and the worker WM are both situated in the prohibited area 100. For example, if the antenna 34A (the worker WM holding the antenna 34A) moves away from the vehicle 3, the prohibited area 100 is expanded. If the antenna 34A (the worker WM holding the antenna 34A) moves close to the vehicle 3, the prohibited area 100 is reduced. Even if the antenna 34A (the worker WM holding the antenna 34A) moves relative to the vehicle 3, the size of the prohibited area 100 is not necessarily changed. Even if the antenna 34A (the worker WM holding the antenna 34A) moves relative to the vehicle 3, as long as the vehicle 3 and the worker WM are situated in the prohibited area 100, the size of the prohibited area 100 is not necessarily changed.

In the embodiment, information on the position (GPS position) of the landmark 8 obtained using the GPS antenna 34A is temporarily stored (held) in the storage device 39 of the vehicle 3.

In the embodiment, whether or not the GPS detection state (position determination state) was favorable is determined before the position registration process of the landmark 8 is performed (step SC4). In the embodiment, the processing device 12 determines based on the GPS detection state whether or not the position of the landmark 8 detected using GPS is registered in the storage device 13.

The GPS detection state (position determination state) includes at least one of a positioning mode, an accuracy index value, and the number of the GPS satellites 5 from which the antenna 34A can receive radio waves. The positioning mode includes at least one of single point positioning, relative positioning, a float solution, and a fixed solution.

The determination of whether or not the GPS detection state (position determination state) was favorable includes the determination of whether or not the GPS position detection result is high in reliability. The determination of whether or not the GPS detection state (position determination state) was favorable includes the determinations of whether or not states where detection accuracy (position determination accuracy) by GPS is reduced and where detection (position determination) by GPS becomes impossible have occurred at the mine. For example, if the antenna 29A could not fully receive radio waves from the GPS satellites 5 at the mine due to the influence of an obstacle, it is determined that at least one of the states where detection accuracy (position determination accuracy) by GPS is reduced and where detection (position determination) by GPS becomes impossible has occurred, and it is determined that the GPS detection state (position determination state) was not favorable. Moreover, if the number of the GPS satellites 5 from which the antenna 29A can receive radio waves is small, it is determined that at least one of the states where detection accuracy (position determination accuracy) by GPS is reduced and where detection (position determination) by GPS becomes impossible has occurred, and it is determined that the detection state (position determination state) of GPS was not favorable. Moreover, if the number of the GPS satellites 5 from which the antenna 34A can receive radio waves is small, it is determined that at least one of the states where detection accuracy (position determination accuracy) by GPS is reduced and where detection (position determination) by GPS becomes impossible has occurred, and it is determined that the GPS detection state (position determination state) was not favorable.

If it is determined in step SC4 that the GPS detection state (position determination state) was not favorable, a message to the effect that the GPS detection state was not favorable is displayed on the display device 36 (step SC10). It may be configured such that a signal to the effect that the GPS detection state (position determination state) was not favorable is transmitted to the processing device 12 of the control apparatus 10 via the communication system 9, and the message to the effect that the GPS detection state (position determination state) was not favorable is displayed on the display device 16 of the control apparatus 10. If it is determined that the GPS detection state (position determination state) was not favorable, the position detection process of the landmark 8 is performed again (step SC1).

If the GPS detection state (position determination state) was not favorable, information on the position of the landmark 8 detected by GPS in the state where the detection state (position determination state) was not favorable may be inaccurate (low in reliability) due to, for example, the inclusion of an error. In the embodiment, whether or not the GPS detection state (position determination state) was favorable is determined before the position registration process of the landmark 8 is performed, and the information on the position of the landmark 8 detected by GPS in the state where the detection state (position determination state) was not favorable is not registered in the storage device 13. Consequently, the position of the landmark 8 that is highly likely to be inaccurate (low in reliability) is prevented from being registered in the storage device 13.

If it is determined in step SC4 that the GPS detection state (position determination state) was favorable, it is determined whether or not a relationship (positional relationship) between the position of the landmark 8 already registered in the storage device 13 (the database 13B) and the position of the landmark 8 detected using GPS in step SC3 is a desired positional relationship before the position registration process of the landmark 8 is performed (step SC5). In the embodiment, the processing device 12 determines whether or not the position (GPS position) of the landmark 8 detected using GPS is registered in the storage device 13, based on the relationship (positional relationship) between the position (GPS position) of the landmark 8 already registered in the storage device 13 and the position (GPS position) of the landmark 8 detected using GPS in step SC3.

In the embodiment, the processing device 12 determines whether or not a distance between the position (GPS position) of the landmark 8 already registered in the storage device 13 and the position (GPS position) of the landmark 8 detected using GPS in step SC3 is a predetermined value (threshold value) or more. The processing device 12 determines whether or not the position of the landmark 8 detected using GPS is registered in the storage device 13, based on the distance between the position (GPS position) of the landmark 8 already registered in the storage device 13 and the position (GPS position) of the landmark 8 detected using GPS in step SC3.

If the distance between the position (GPS position) of the landmark 8 already registered in the storage device 13 and the position (GPS position) of the landmark 8 detected using GPS in step SC3 is short, the registration of the position (GPS position) of the landmark 8 detected using GPS in the storage device 13 may lead to an inaccurate correction of the position (estimated position) of the dump truck 2 derived by dead reckoning upon making a correction using the landmark 8. In other words, if the positions (GPS positions) of two landmarks 8 close to each other are registered in the storage device 13, a correction may not be made accurately. As described above, if the position (estimated position) of the dump truck 2 derived by dead reckoning is corrected based on the detection result of the non-contact sensor 24 that detects the landmark 8, information on the position (absolute position) of the landmark 8 corresponding to the landmark 8 detected by the non-contact sensor 24 among the plurality of the landmarks 8 registered in the storage device 13 is extracted from the storage device 13. For example, information is extracted from the storage device 13, the information being about the position of the landmark 8 determined to be at the closest position (GPS position) to the position (estimated position) of the dump truck 2 derived based on dead reckoning when detecting the landmark 8 using the non-contact sensor 24 among the plurality of the landmarks 8 registered in the storage device 13. If the positions (GPS positions) of two landmarks 8 close to each other are registered in the storage device 13, it may become difficult for the processing device 12 to extract from the storage device 13 information on the position (absolute position) of the landmark 8 corresponding to the landmark 8 detected by the non-contact sensor 24 among the plurality of the landmarks 8 registered in the storage device 13. For example, it may be determined that there are two landmarks 8 that are at the closest position (GPS position) to the position (estimated position) of the dump truck 2 derived based on dead reckoning when detecting the landmark 8 using the non-contact sensor 24 among the plurality of the landmarks 8 registered in the storage device 13. Moreover, if the positions (GPS positions) of two landmarks 8 that are close to each other are registered in the storage device 13, the position of one of the two landmarks 8 that are close to each other may falsely be extracted when the other should be extracted. As a consequence, a correction of the estimated position by dead reckoning may not be made accurately.

In the embodiment, if the distance between the landmark 8 already registered in the storage device 13 and the landmark 8 detected using GPS in step SC3 is short (is less than the threshold value), information on the position of the landmark 8 detected using GPS is not registered in the storage device 13. In the embodiment, if the distance between the landmark 8 already registered in the storage device 13 and the landmark 8 detected using GPS in step SC3 is sufficiently long (is the threshold value or more), information on the position of the landmark 8 detected using GPS is registered in the storage device 13. The threshold value may be determined based on, for example, the size of the detection area 300 of the non-contact sensor 24. Consequently, the occurrence of trouble of extracting the position of the landmark 8 that is not correspond to the landmark 8 detected by the non-contact sensor 24 among the plurality of the landmarks 8 registered in the storage device 13 is suppressed in the correction of the estimated position derived by dead reckoning.

If it is determined in step SC5 that the distance between the landmark 8 already registered in the storage device 13 and the landmark 8 detected using GPS in step SC3 is not sufficient (is less than the threshold value), a message to the effect the distance is not sufficient is displayed on the display device 36 (step SC10). It may be configured such that a signal to the effect that the distance is not sufficient is transmitted to the processing device 12 of the control apparatus 10 via the communication system 9, and a message to the effect that the distance is not sufficient is displayed on the display device 16 of the control apparatus 10. If it is determined that the distance is not sufficient, the position detection process of the landmark 8 is performed again (step SC1).

If it is determined in step SC5 that the distance between the landmark 8 already registered in the storage device 13 and the landmark 8 detected using GPS in step SC3 is sufficiently long, the worker WM returns to the inside of the vehicle 3 (rides in the vehicle 3) carrying the antenna 34A. The antenna 34A is loaded into the vehicle 3. The worker WM rides in the vehicle 3 and mounts the antenna 34A in the vehicle 3 and accordingly the position detection process of the landmark 8 ends.

If it is determined in step SC5 that the distance between the landmark 8 already registered in the storage device 13 and the landmark 8 detected using GPS in step SC3 is sufficiently long (is the threshold value or more), the position registration process of the detected landmark 8 is performed.

The information on the position (GPS position) of the landmark 8 obtained using the GPS antenna 34A is registered (stored) in the storage device 13 (the database 13B) of the control apparatus 10. In the embodiment, the input device 31 placed in the vehicle 3 is operated to register the position of the landmark 8 in the storage device 13. The input device 31 functions as the operating unit that can input an operation signal into the processing device 30. The worker WM operates the input device 31 to start the position registration process of the landmark 8 (step SC6). In the embodiment, the input device 31 includes the touch panel. The touch panel includes a registration button for instructing the processing device 30 to start the position registration process of the landmark 8. The operating unit includes the registration button. The worker WM presses (operates) the registration button.

The operating unit (registration button) of the input device 31 is operated to cause the processing device 30 to transmit from the wireless communication device 32 the information on the position of the landmark 8 temporarily stored in the storage device 39. The wireless communication device 32 transmits the information on the position of the landmark 8 to the wireless communication device 18 of the control apparatus 10. The wireless communication device 18 outputs to the processing device 12 the received information on the position of the landmark 8. The processing device 12 registers the acquired information on the position (GPS position) of the landmark 8 in the database 13B of the storage device 13 (step SC7).

The operating unit (registration button) of the input device 31 is operated to input an operation signal into the processing device 30. The processing device 30 transmits from the wireless communication device 32 the operation signal input from the operating unit of the input device 31. The wireless communication device 18 of the control apparatus 10 receives the operation signal from the wireless communication device 32 and outputs the operation signal to the processing device 12. The processing device 12 acquires the operation signal from the input device 31, and then sets the prohibited area 200 (see FIG. 12) where the entry of the dump truck 2 is prohibited so as to include the position of the landmark 8 (step SC8). In the embodiment, the processing device 12 may simultaneously perform the acquisition of the operation signal from the input device 31 and the setting of the prohibited area 200. The processing device 12 may set the prohibited area 200 after a lapse of a predetermined time (for example, after a lapse of one second) since the acquisition of the operation signal from the input device 31.

The processing device 12 may acquire the information on the position (GPS position) of the landmark 8 via the communication system 9 and then set the prohibited area 200 prior to its registration in the database 13B of the storage device 13. The processing device 12 may set the prohibited area 200 and then register the information on the position (GPS position) of the landmark 8 in the database 13B of the storage device 13.

The processing device 12 sets the prohibited area 200 based on the detection result of the position detection device 34 acquired via the communication system 9 so as to include the position of the landmark 8. The position detection device 34 detects the GPS position of the antenna 34A to detect the GPS position of the landmark 8 situated in the vicinity of the antenna 34A. The processing device 12 can set the prohibited area 200 based on the GPS coordinate system so as to include the GPS position of the landmark 8.

The processing device 12 transmits an instruction signal to the dump truck 2 via the communication system 9 to prevent the dump truck 2 from entering the prohibited area 200. The instruction signal is transmitted from the wireless communication device 18 placed in the control facility 7 to the wireless communication device 28 placed in the dump truck 2. The instruction signal includes information on a travel route generated so as to cause the dump truck 2 to skirt around the prohibited area 200 (so as to prevent the dump truck 2 from entering the prohibited area 200). The wireless communication device 28 of the dump truck 2 receives the instruction signal from the wireless communication device 18 of the control apparatus 10 and outputs the instruction signal to the processing device 20. The processing device 20 (the travel control unit 20D) controls the travel (operation) of the dump truck 2 so as to prevent the dump truck 2 from entering the prohibited area 200. The prohibited area 200 is defined in the GPS coordinate system. The processing device 12 (the travel route generation unit 12C) generates a travel route in the GPS coordinate system. The processing device 20 controls the travel of the dump truck 2 based on the GPS position of the dump truck 2. In other words, the prohibited area 200, the position of the dump truck 2, and the travel route are respectively defined in the GPS coordinate system. Therefore, the processing device 12 can generate a travel route so as to prevent the dump truck 2 from entering the prohibited area 200. The processing device 12 can transmit an instruction signal to the dump truck 2 to prevent the dump truck 2 from entering the prohibited area 200. The processing device 20 can control the dump truck 2 so as to prevent the dump truck 2 from entering the prohibited area 200.

Figure 12:
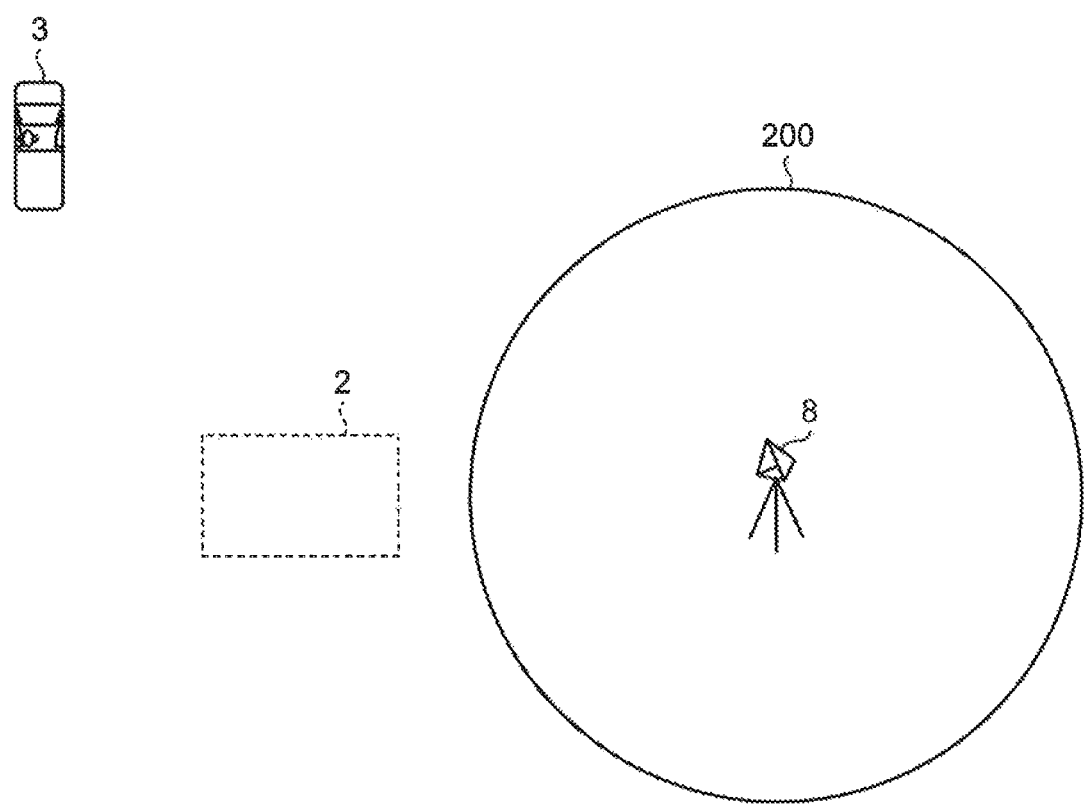
FIG. 12 is a diagram illustrating an example of the prohibited area according to the embodiment.

FIG. 12 is a diagram illustrating an example of the prohibited area 200. As illustrated in FIG. 12, the prohibited area 200 is set so as to include the position of the landmark 8. In the example illustrated in FIG. 12, the external shape of the prohibited area 200 is a circle. The external shape of the prohibited area 200 may be a polygon such as a rectangle. The landmark 8 is situated in the prohibited area 200. The prohibited area 200 is defined based on the GPS coordinate system. Therefore, the prohibited area 200 is set to enable the processing device 12 to prohibit the dump truck 2 running based on the GPS coordinate system from entering the inside of the prohibited area 200.

An instruction signal is transmitted from the communication system 9 to the processing device 20 of the dump truck 2 to prevent the dump truck 2 from entering the prohibited area 200. The processing device 20 controls the travel (operation) of the dump truck 2 so as to prevent the dump truck 2 from entering the prohibited area 200.

If a worker (occupant) WM different from the worker WM who is working outside the vehicle 3 is in the vehicle 3, the occupant WM may operate the registration button before the worker WM who is working outside the vehicle 3 returns to the inside of the vehicle 3. The prohibited area 200 may be set by the operation of the registration button (operating unit).

The information on the position of the landmark 8 temporarily stored in the storage device 13 may be registered in the database 13B by temporarily storing the information on the position of the landmark 8 in the storage device 13 of the control apparatus 10 via the communication system 9 and the operator operating the input device 17 of the control apparatus 10. The prohibited area 200 may be set by the operation of the input device 17.

In the embodiment, the worker WM rides in the vehicle 3 and then operates the input device 31 placed in the vehicle 3. The input device 31 functions as the operating unit that can input an operation signal into the processing device 30. The worker WM operates the input device 31 to end the position detection process of the landmark 8 (step SC9). In the embodiment, the input device 31 includes the touch panel. The touch panel includes an end button for instructing the processing device 30 to end the position detection process of the landmark 8. The operating unit includes the end button. The worker WM presses (operates) the end button.

The operating unit (end button) of the input device 31 is operated to input an operation signal into the processing device 30. The processing device 30 transmits, from the wireless communication device 32, the operation signal input from the operating unit of the input device 31. The wireless communication device 18 of the control apparatus 10 receives the operation signal from the wireless communication device 32 and outputs the operation signal to the processing device 12. The processing device 12 cancels the setting of the prohibited area 100 including the position of the antenna 34A after the operation signal is input from the input device 31.

With the above, the position detection process and the position registration process of the landmark 8 end. The worker WM may operate (drive) the vehicle 3 and, for example, return to the control facility 7. The worker WM may move operating (driving) the vehicle 3 for the position detection process and the position registration process of another landmark 8.

In the embodiment, even after the setting of the prohibited area 100 including the position of the antenna 34A is canceled, the prohibited area 100 including the position of the antenna 33A is continued to be set. Consequently, even if the vehicle 3 runs at the mine, the dump truck 2 is prohibited from approaching the vehicle 3.

The setting of the prohibited area 100 including the position of the antenna 34A may not be canceled after the end of the position detection process of the landmark 8.

As described above, according to the embodiment, it is configured such that the prohibited area 200 is set based on the GPS position of the antenna 34A so as to include the GPS position of the landmark 8. Accordingly, the dump truck 2 is prevented from approaching the landmark 8. Therefore, the contact between the landmark 8 and the dump truck 2 is prevented. Consequently, for example, the operation of the dump truck 2 is prevented from being stopped due to the contact with the landmark 8. Therefore, a reduction in productivity at the mine is suppressed.

According to the embodiment, it is configured such that the prohibited area 100 is set based on the GPS position of the antenna 33A so as to include the GPS position of the antenna 33A. Accordingly, the dump truck 2 is prevented from approaching the vehicle 3. Therefore, a reduction in the working efficiency of the worker WM manning the vehicle 3 is suppressed. Moreover, the safety of the vehicle 3 (the worker WM manning the vehicle 3) is secured. Moreover, according to the embodiment, it is configured such that the prohibited area 100 is set based on the GPS position of the antenna 33A and the GPS position of the antenna 34A so as to include both GPS positions of the antennas 33A and 34A. Accordingly, the dump truck 2 is prevented from approaching each of the antenna 33A (the vehicle 3) and the antenna 34A. Therefore, even if work using the antenna 34A is carried out outside the vehicle 3, a reduction in its working efficiency is suppressed. Moreover, the safety of the worker WM existing in the prohibited area 100 including the position of the antenna 34A is secured. Moreover, the dump truck 2 does not enter each of the prohibited area (working area) 100 including the position of the antenna 33A, and the prohibited area (working area) 100 including the position of the antenna 34A. Accordingly, for example, an interruption of work in the prohibited area (working area) 100 at the approach of the dump truck 2 is suppressed.

The processes of steps SC4 to SC5 may be omitted in the processing described with reference to FIG. 10.

<Generation of Travel Route>

Figure 13:
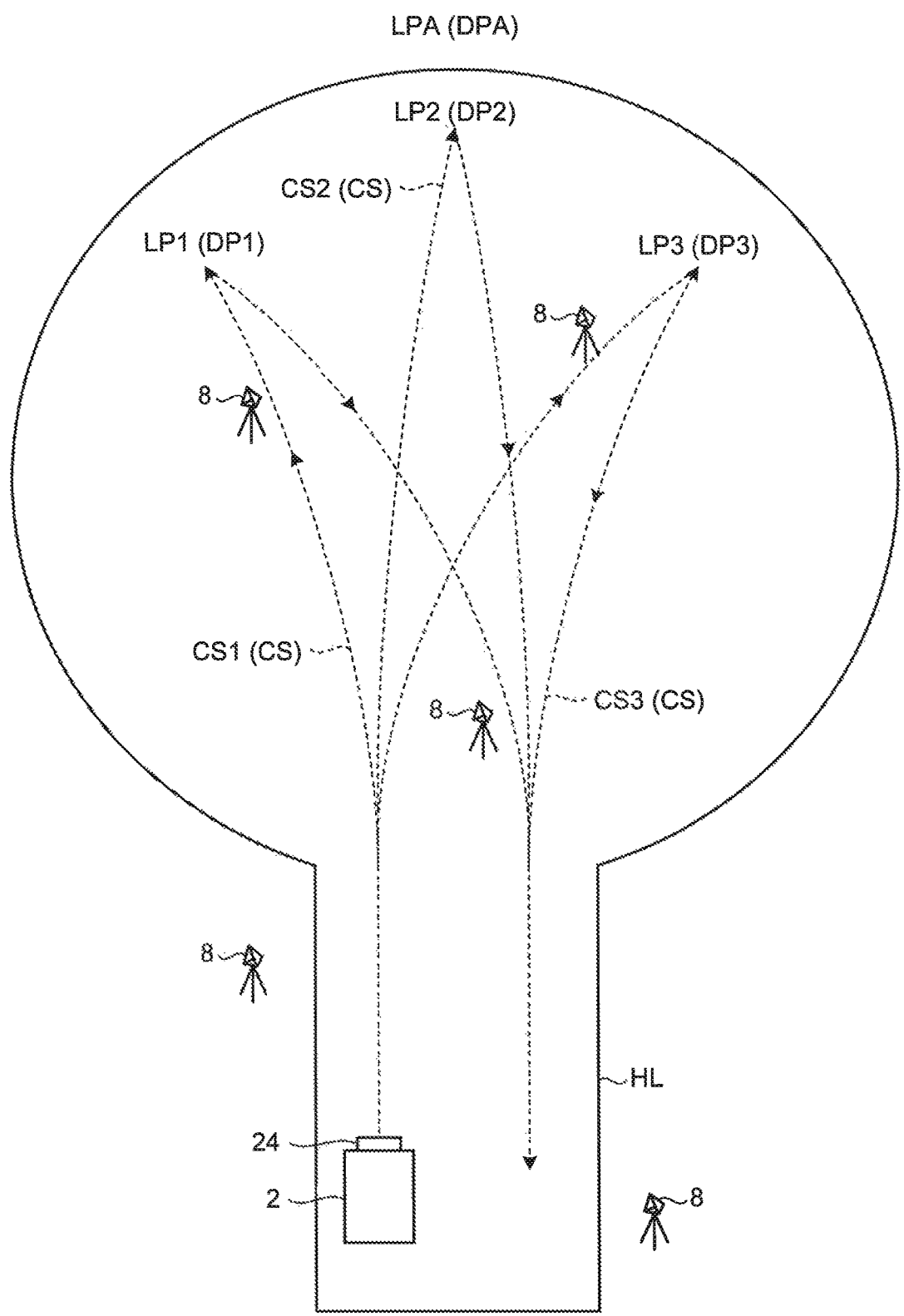
FIG. 13 is a diagram illustrating an example of a travel route according to the embodiment.

Next, an example of a travel route generation process by the processing device 12 (the travel route generation unit 12C) will be described. FIG. 13 is a diagram illustrating an example of a travel route of the dump truck 2.

As illustrated in FIG. 13, the dump truck 2 runs along a travel route CS generated by the processing device 12 on at least parts of the load site LPA, the dump site DPA, and the haul road HL leading to at least one of the load site LPA and the dump site DPA.

Moreover, a plurality of the landmarks 8 is respectively placed at the load site LPA, the dump site DPA, and the haul road HL to correct an estimated position derived based on dead reckoning.

The loading position LP at the load site LPA may change based on, for example, at least one of an excavation state and an excavation period at the mine. FIG. 13 schematically illustrates changes in the loading position LP at the load site LPA. FIG. 13 illustrates an example where the loading operation is performed at each of a first loading position LP1, a second loading position LP2, and a third loading position LP3 at the load site LPA. The second loading position LP2 is different from the first loading position LP1. The third loading position LP3 is different from the first loading position LP1 and the second loading position LP2.

Similarly, the dumping position DP at the dump site DPA may change based on, for example, at least one of a deposit state and a deposit period of a load. As illustrated in FIG. 13, the deposit operation may be performed at each of a first dumping position DP1, a second dumping position DP2, and a third dumping position DP3 at the dump site DPA. The second dumping position DP2 is different from the first dumping position DP1. The third dumping position DP3 is different from the first dumping position DP1 and the second dumping position DP2.

The processing device 12 (the travel route generation unit 12C) generates the travel route CS in accordance with a change in the loading position LP. The processing device 12 (the travel route generation unit 12C) generates (updates, changes) the travel route CS based on the loading position LP whenever the loading position LP changes. For example, if the loading operation is performed at the first loading position LP1, the processing device 12 generates a travel route CS1 based on the first loading position LP1. If the loading operation is performed at the second loading position LP2, the processing device 12 generates a travel route CS2 based on the second loading position LP2. If the loading operation is performed at the third loading position LP3, the processing device 12 generates a travel route CS3 based on the third loading position LP3.

Similarly, the processing device 12 (the travel route generation unit 12C) generates the travel route CS in accordance with a change in the dumping position DP. The processing device 12 (the travel route generation unit 12C) generates (updates, changes) the travel route CS based on the dumping position DP whenever the dumping position DP changes. If the dumping operation is performed at the first dumping position DP1, if the dumping operation is performed at the second dumping position DP2, and if the dumping operation is performed at the third dumping position DP3, the processing device 12 generates the different travel routes CS (CS1, CS2, CS3), respectively.

The landmarks 8 may be placed not only outside (at the shoulder of) the haul road HL but also respectively at the load site LPA and the dump site DPA. As described above, the landmark 8 is a stationary object. If the travel route CS is generated (updated, changed) based on a change in the loading position LP (the dumping position DP), the processing device 12 generates the travel route CS so as to prevent the dump truck 2 from entering the prohibited area 200 including the position of the landmark 8.

Figure 14:
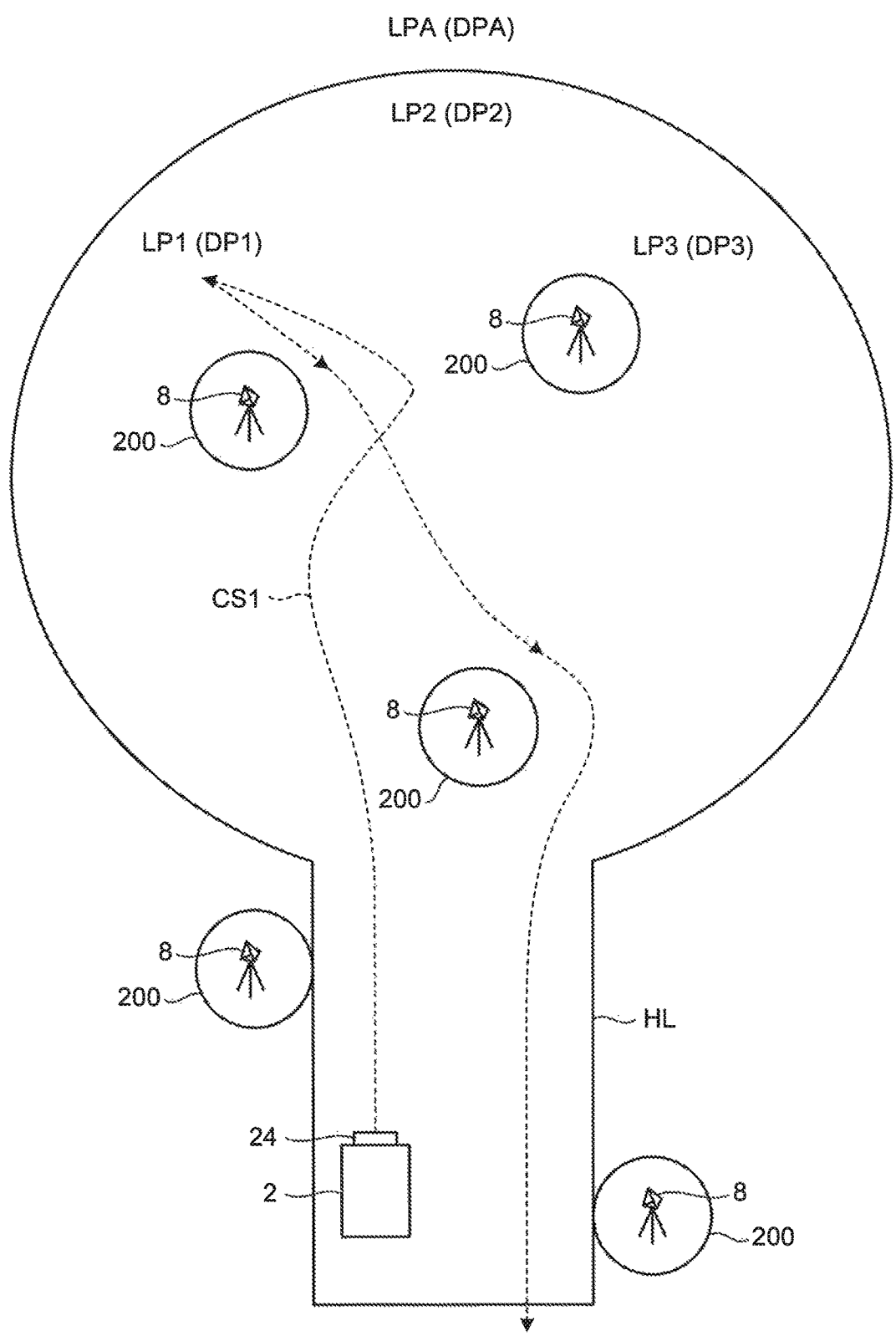
FIG. 14 is a diagram illustrating an example of the travel route according to the embodiment.

FIG. 14 illustrates an example of the travel route CS1 generated so as to prevent the dump truck 2 from entering the prohibited area 200 at the load site LPA. The processing device 12 generates the travel route CS1 so as to prevent the dump truck 2 from entering the prohibited areas 200 set for the landmarks 8 placed at the haul road HL and the load site LPA and cause the dump truck 2 to run skirting around the prohibited areas 200. Upon the generation of a travel route, one or both of that the travel distance is not long and that the turning radius is not too small, and the like are considered. In the example illustrated in FIG. 14, the travel route CS1 indicates an example of a travel route of the dump truck 2 that runs from the haul road HL toward the first loading position LP1 at the load site LPA, performs the loading operation at the first loading position LP1, and then runs on the haul road HL. As illustrated in FIG. 14, for the haul road HL, the landmark 8 is placed outside (at the shoulder of) the haul road HL so as to prevent the setting of the prohibited area 200 at the haul road HL. The prohibited area 200 may be set such that the peripheral edge of the prohibited area 200 overlaps with the peripheral edge of the haul road HL, or that at least part of the prohibited area 200 may be set at the haul road HL.

The dump truck 2 runs on the haul road HL and the load site LPA along the generated travel route CS1 to perform the loading operation at the first loading position LP1 at the load site LPA. The travel route CS1 is set so as to prevent the dump truck 2 from entering the prohibited area 200. Therefore, the contact between the dump truck 2 and the landmark 8 is prevented.

Figure 15:
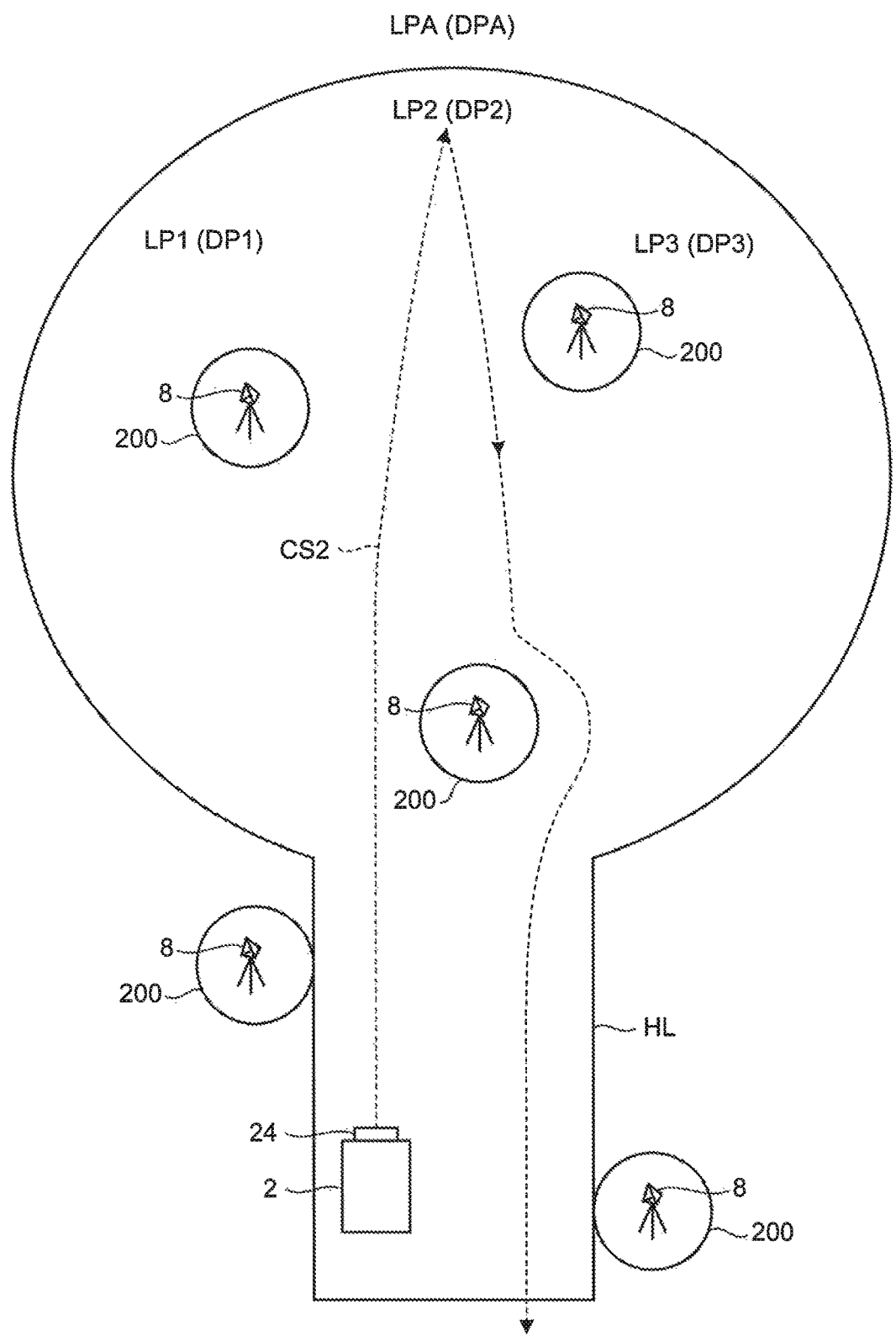
FIG. 15 is a diagram illustrating an example of the travel route according to the embodiment.

FIG. 15 illustrates an example of the travel route CS2 generated so as to prevent the dump truck 2 from entering the prohibited area 200 at the load site LPA. The processing device 12 generates the travel route CS2 so as to prevent the dump truck 2 from entering the prohibited areas 200 set for the landmarks 8 placed at the haul road HL and the load site LPA and cause the dump truck 2 to run skirting around the prohibited areas 200. In the example illustrated in FIG. 15, the travel route CS2 indicates an example of a travel route of the dump truck 2 that runs from the haul road HL toward the second loading position LP2 at the load site LPA, performs the loading operation at the second loading position LP2, and then runs on the haul road HL.

The dump truck 2 runs on the haul road HL and the load site LPA along the generated travel route CS2 to perform the loading operation at the second loading position LP2 at the load site LPA. The travel route CS2 is set so as to prevent the dump truck 2 from entering the prohibited area 200. Therefore, the contact between the dump truck 2 and the landmark 8 is prevented.

The illustration is omitted, but the processing device 12 generates the travel route CS3 of the dump truck 2 that runs from the haul road HL toward the third loading position LP3 at the load site LPA, performs the loading operation at the third loading position LP3, and then runs on the haul road HL. The travel route CS3 is set so as to prevent the dump truck 2 from entering the prohibited area 200. Therefore, the contact between the dump truck 2 and the landmark 8 is prevented.

The same shall apply at the load site DPA. The processing device 12 generates the travel routes CS (CS1, CS2, CS3) such that the deposit operations are performed respectively at the first dumping position DP1, the second dumping position DP2, and the third dumping position DP3 at the dump site DPA. The travel route CS is set so as to prevent the dump truck 2 from entering the prohibited area 200. Therefore, the contact between the dump truck 2 and the landmark 8 is prevented.

In the embodiment, the processing device 12 generates the travel route CS such that the landmark 8 is situated in the detection area 300 of the non-contact sensor 24 placed on the dump truck 2 during the travel of the dump truck 2.

Figure 16:
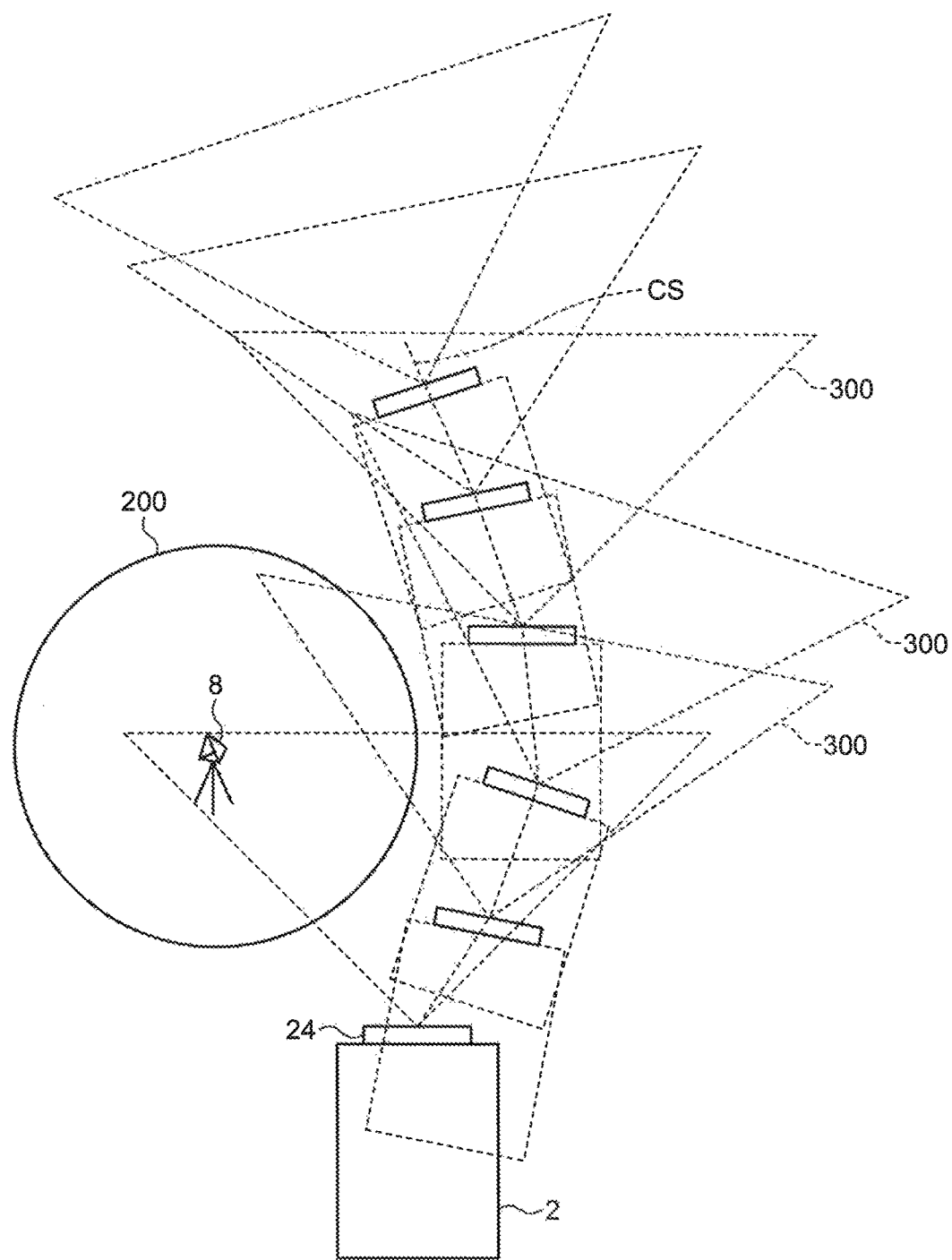
FIG. 16 is a diagram illustrating an example of the travel route according to the embodiment.

FIG. 16 schematically illustrates an example of the dump truck 2 running along the travel route CS. As described above, the non-contact sensor 24 includes the detection area 300 where the landmark 8 can be detected. The landmark 8 is situated in the detection area 300 and accordingly the non-contact sensor 24 can detect the landmark 8.

In other words, in the embodiment, the processing device 12 generates the travel route CS such that the dump truck 2 does not enter the prohibited area 200 and that the landmark 8 is situated in the detection area 300 of the non-contact sensor 24 during the travel of the dump truck 2. Consequently, the contact between the dump truck 2 and the landmark 8 is avoided while the landmark 8 is detected by the non-contact sensor 24. The landmark 8 is detected and accordingly the position (estimated position) of the dump truck 2 derived by, for example, dead reckoning can be corrected based on the GPS position (absolute position) of the landmark 8.

The travel route CS that does not allow the dump truck 2 to enter the prohibited area 200 and that causes the landmark 8 to be situated in the detection area 300 of the non-contact sensor 24 during the travel of the dump truck 2 can be obtained by, for example, a simulation. The position (GPS position) of the landmark 8 placed at the mine (at least one of the load site LPA, the dump site DPA, and the haul road HL) is known information. The position and size of the detection area 300 of the non-contact sensor 24 for the dump truck 2 are also known information. Therefore, the processing device 12 can generate the travel route CS that does not allow the dump truck 2 to enter the prohibited area 200 and that causes the landmark 8 to be situated in the detection area 300 of the non-contact sensor 24 during the travel of the dump truck 2, by performing a simulation based on these pieces of known information.

Figure 17:
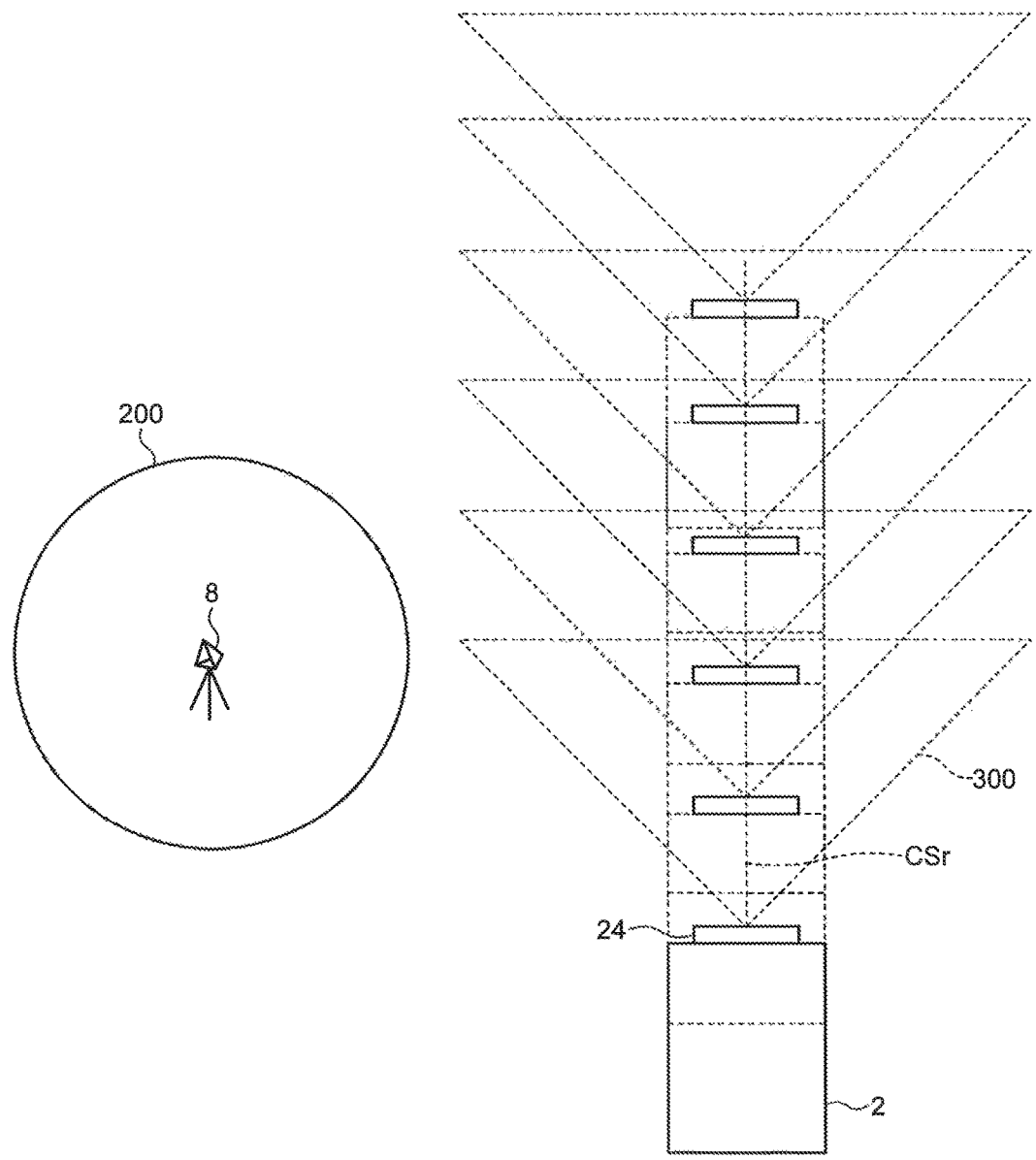
FIG. 17 is a diagram illustrating the travel route according to a comparative example.

FIG. 17 illustrates a comparative example. The dump truck 2 running along a route CSr illustrated in FIG. 17 does not enter the prohibited area 200. However, the landmark 8 is not situated in the detection area 300 of the non-contact sensor 24 placed on the dump truck 2 running along the route CSr. In this case, it is difficult for the non-contact sensor 24 to detect the landmark 8. As a consequence, it is difficult for the processing device 12 to correct the position (estimated position) of the dump truck 2 derived by dead reckoning based on the GPS position (absolute position) of the landmark 8.

In the embodiment, the processing device 12 generates the travel route CS such that the dump truck 2 does not enter the prohibited area 200 and that the landmark 8 is situated in the detection area 300 of the non-contact sensor 24 during the travel of the dump truck 2. Consequently, the contact between the dump truck 2 and the landmark 8 is avoided while the landmark 8 is detected by the non-contact sensor 24.

In the embodiment, the processing device 12 may adjust the size of the prohibited area 200 such that the landmark 8 is situated in the detection area 300 of the non-contact sensor 24. If the prohibited area 200 is too large and it is difficult to generate the travel route CS that does not allow the dump truck 2 to enter the prohibited area 200 and that causes the landmark 8 to be situated in the detection area 300 of the non-contact sensor 24 during the travel of the dump truck 2, the processing device 12 may adjust the size of the prohibited area 200 such that the dump truck 2 does not enter the prohibited area 200 and that the landmark 8 is situated in the detection area 300 of the non-contact sensor 24 during the travel of the dump truck 2.

A situation where it is difficult for the non-contact sensor 24 to detect the landmark 8 may occur depending on the travel route CS even if the landmark 8 is situated in the detection area 300 of the non-contact sensor 24. For example, with respect to the dump truck 2 (the non-contact sensor 24) running on the travel route CS, if the reflecting portion of the landmark 8 is placed so as to face the opposite direction to the dump truck 2 (the non-contact sensor 24), it may be difficult for the non-contact sensor 24 to detect the landmark 8 even if the landmark 8 is situated in the detection area 300 of the non-contact sensor 24. In such a case, the processing device 12 may generate the travel route CS such that the landmark 8 is detected by the non-contact sensor 24, considering the orientation of the reflecting portion of the landmark 8.

In the above-mentioned embodiment, the example has been described where the processing device 12 of the control facility 7 (the control apparatus 10) acquires the detection result of the position detection device 33 and the position detection result of the position detection device 34 via the communication system 9, sets the prohibited areas 100 and 200, and transmits an instruction signal to the dump truck 2. The processing device 20 of the dump truck 2 may acquire the detection result of the position detection device 33 and the position detection result of the position detection device 34 and set one or both of the prohibited areas 100 and 200.

The processing device 20 of the dump truck 2 may control the travel of the dump truck 2 based on the set prohibited areas 100 and 200 so as to prevent the dump truck 2 from entering the prohibited areas 100 and 200.

In the above-mentioned embodiment, the processing device 30 of the vehicle 3 may acquire the detection result of the position detection device 33 and the position detection result of the position detection device 34 via the communication system 9 (the wireless communication devices 28 and 32) and set one or both of the prohibited areas 100 and 200. The processing device 30 of the vehicle 3 may transmit information on the set prohibited areas 100 and 200 to the dump truck 2 via the communication system 9 (the wireless communication devices 32 and 28). In other words, the information on the prohibited areas 100 and 200 set by the processing device 30 may be transmitted from the wireless communication device 32 of the vehicle 3 to the wireless communication device 28 of the dump truck 2. The processing device 20 of the dump truck 2 may control the travel of the dump truck 2 based on the prohibited areas 100 and 200 set by the processing device 30 of the vehicle 3 so as to prevent the dump truck 2 from entering the prohibited areas 100 and 200.

In the above-mentioned embodiments, it is configured such that the position detection process of the landmark 8 is carried out in the prohibited area 100. The process (work) carried out in the prohibited area 100 is not limited to the position detection process of the landmark 8. For example, the maintenance work of the haul road HL or the repair work of equipment may be carried out in the prohibited area 100 set based on the antenna 34A. Also in this case, the prohibited area (working area) 100 is set so as to include the position of the antenna 34A and accordingly the safety of the worker WM is secured and a reduction in working efficiency is suppressed.

In the above-mentioned embodiments, the example has been described where the worker WM carries out work (a process) in the prohibited area 100. Also in the work (process) without the worker WM, the prohibited area (working area) 100 is set so as to include the position of the antenna 34A and accordingly a reduction in the working efficiency of the work in the prohibited area (working area) 100 is suppressed. For example, when a mining machine (for example, a motor grader) different from the vehicle 3 and the dump truck 2 operates at the mine, the prohibited area 100 may be placed including the mining machine in order to carry out work using the mining machine smoothly. The mining machine operates in the prohibited area 100 and accordingly, even if the dump truck 2 approaches, it is not necessary to stop the operation of the mining machine. Moreover, the mining machine operates in the prohibited area 100 and accordingly it is not necessary to stop the operation of the dump truck 2. In other words, the mining machine is situated in the prohibited area 100 and accordingly the dump truck 2 can operate concurrently with the operation of the mining machine. Therefore, reductions in working efficiency and productivity at the mine are suppressed.

In the above-mentioned embodiments, it is configured such that the prohibited area 200 including the landmark 8 is set in the position registration process of the landmark 8. The setting of the prohibited area 200 is not limited to the position registration process of the landmark 8. If a structure different from the landmark 8 is installed at the mine, the prohibited area 200 including the structure may be set in the position registration process of the structure.

In the above-mentioned embodiments, the dump truck 2 may be what is called a manned dump truck that operates by operations by a worker (driver). If the prohibited area 100 is set, the communication system 9 may transmit an instruction signal so as to prevent the dump truck (manned dump truck) 2 from entering the prohibited area 100. The communication system 9 may, for example, transmit an instruction signal including an alert (warning) to the dump truck 2 approaching the prohibited area 100.

The elements of the above-mentioned embodiments include elements that can be easily assumed by those skilled in the art, and substantially the same elements, what is called elements within the range of equivalents. Moreover, the elements of the above-mentioned embodiments can be combined as appropriate. Moreover, a part of the components may not be used.

REFERENCE SIGNS LIST

1 MANAGEMENT SYSTEM
2 DUMP TRUCK (MINING MACHINE)
3 VEHICLE
4 LOADING MACHINE
9 COMMUNICATION SYSTEM
10 CONTROL APPARATUS
12 PROCESSING DEVICE
13 STORAGE DEVICE
18 WIRELESS COMMUNICATION DEVICE
20 PROCESSING DEVICE
25 STORAGE DEVICE
28 WIRELESS COMMUNICATION DEVICE
29 POSITION DETECTION DEVICE
29A ANTENNA
30 PROCESSING DEVICE
31 INPUT DEVICE
32 WIRELESS COMMUNICATION DEVICE
33 POSITION DETECTION DEVICE
33A ANTENNA
34 POSITION DETECTION DEVICE
34A ANTENNA
39 STORAGE DEVICE
100 PROHIBITED AREA
200 PROHIBITED AREA
DP DUMPING POSITION
DPA DUMP SITE
HL HAUL ROAD
LP LOADING POSITION
LPA LOAD SITE

The invention claimed is:

1. A management system of a mining machine comprising:
   a landmark that is a structure placed at a mine and allows a non-contact sensor which is different from any Global Positioning System placed on the mining machine able to run at the mine to detect a relative position of the landmark and the mining machine;
   a storage device that registers a position of the landmark detected using a Global Positioning System when the landmark is installed; and
   a processing device that sets, upon the registration, a prohibited area where an entry of the mining machine is prohibited such that the position of the landmark is included in the prohibited area and the prohibited area is provided in a whole circumference of the landmark; and
   a travel control unit that controls a travel of the mining machine, wherein the travel control unit controls the travel of the mining machine to prevent the mining machine from entering the prohibited area, controls the mining machine to travel along a travel route in the mine such that the landmark is placed in a detection area of the non-contact sensor, determines when the mining machine has deviated from the travel route based on the detected relative position of the landmark and the mining machine, and corrects a position of the mining machine when the mining machine has deviated from the travel route.

2. The management system of a mining machine according to claim 1, further comprising an operating unit able to input an operation signal for registering the position of the landmark after the position of the landmark is detected using the Global Positioning System, wherein
the registration includes an operation of the operating unit.

3. The management system of a mining machine according to claim 1, further comprising a communication system that transmits an instruction signal to the mining machine to prevent the mining machine from entering the prohibited area.

4. The management system of a mining machine according to claim 1, further comprising a generation apparatus that generates a travel route on which the mining machine runs, wherein
the mining machine runs along the travel route on at least a part of a load site, a dump site, and a haul road leading to at least one of the load site and the dump site at the mine, and
the generation apparatus generates the travel route to prevent the mining machine from entering the prohibited area.

5. The management system of a mining machine according to claim 4, wherein the generation apparatus generates the travel route in a manner where the landmark is situated in a detection area of the non-contact sensor.

6. The management system of a mining machine according to claim 1, wherein whether the position of the landmark detected using the Global Positioning System is registered in the storage device is determined based on a detection state of the Global Positioning System.

7. The management system of a mining machine according to claim 1, wherein whether the position of the landmark detected using the Global Positioning System is registered in the storage device is determined based on a relationship between the position of the landmark registered in the storage device and the position of the landmark detected using the Global Positioning System.

8. The management system of a mining machine according to claim 1, further comprising a plurality of the landmarks installed at different places throughout the mine, each of the landmarks having their position registered in the storage device, the travel control unit controlling travel of the mining machine along a travel route in the mine so that each of the landmarks is placed in a detection area of the non-contact sensor when the mining machine is in a vicinity of the landmark.

9. A management system of a mining machine, including a central control apparatus placed in a control facility, the management system comprising:
a landmark that is a structure placed at a mine and allows a non-contact sensor which is different from any Global Positioning System placed on the mining machine able to run at the mine to detect a relative position of the landmark and the mining machine;
a storage device that is provided in the central control apparatus and registers a position of the landmark detected using a Global Positioning System when the landmark is installed;
a processing device that is provided in the central control apparatus and sets, upon the registration, a prohibited area where an entry of the mining machine is prohibited such that the position of the landmark is included in the prohibited area and the prohibited area is provided in a whole circumference of the landmark;
a generation apparatus that is provided in the central control apparatus and generates a travel route on which the mining machine runs to avoid the prohibited area; and
a communication system that transmits to the mining machine information on the travel route generated by the generation apparatus,
wherein the mining machine runs at the mine in accordance with the information on the travel route transmitted from the central control apparatus by the communication system,wherein the generation apparatus generates the travel route in a manner where the landmark is situated in a detection area of the non-contact sensor, and
wherein the mining machine is controlled to prevent the mining machine from entering the prohibited area, is controlled to travel along the travel route in the mine such that the landmark is placed in a detection area of the non-contact sensor, determines when the mining machine has deviated from the travel route based on a detected relative position of the landmark and the mining machine, and corrects a position of the mining machine when the mining machine has deviated from the travel route.

10. The management system of a mining machine according to claim 9, wherein whether the position of the landmark detected using the Global Positioning System is registered in the storage device is determined based on a detection state of the Global Positioning System.

11. The management system of a mining machine according to claim 9, wherein whether the position of the landmark detected using the Global Positioning System is registered in the storage device is determined based on a relationship between the position of the landmark registered in the storage device and the position of the landmark detected using the Global Positioning System.

12. A management method of a mining machine comprising:
detecting a position of a landmark that is a structure placed at a mine using a Global Positioning System;
registering the detected position of the landmark in a storage device when the landmark is installed;
upon the registration, setting a prohibited area where an entry of the mining machine able to run at the mine is prohibited such that the position of the landmark is included in the prohibited area and the prohibited area is provided in a whole circumference of the landmark;
allowing a non-contact sensor which is different from the Global Positioning System placed on the mining machine to detect a relative position of the landmark and the mining machine;
controlling a travel of the mining machine to prevent the mining machine from entering the prohibited area;
controlling a travel of the mining machine along a travel route in the mine such that the landmark is placed in a detection area of the non-contact sensor;

determining when the mining machine has deviated from the travel route based on the detected relative position of the landmark and the mining machine; and correcting a position of the mining machine when the mining machine has deviated from the travel route.

* * * * *